US012802538B2

(12) United States Patent
Carlson et al.

(10) Patent No.: US 12,802,538 B2
(45) Date of Patent: Nov. 17, 2026

(54) CUSTOMIZABLE SECURITY ALARM SYSTEM COMPRISING AN RFID TAG, AND METHOD OF INSTALLING THE SAME

(71) Applicant: 1010210 B.C. Ltd., Surrey (CA)

(72) Inventors: Paul Justin Carlson, Surrey (CA); Julian Paul Carlson, Surrey (CA)

(73) Assignee: 1010210 B.C. Ltd., Surrey (CA)

( * ) Notice: Subject to any disclaimer, the term of this patent is extended or adjusted under 35 U.S.C. 154(b) by 0 days.

(21) Appl. No.: 18/253,255

(22) PCT Filed: Nov. 19, 2020

(86) PCT No.: PCT/CA2020/051582
§ 371 (c)(1),
(2) Date: May 17, 2023

(87) PCT Pub. No.: WO2022/104446
PCT Pub. Date: May 27, 2022

(65) Prior Publication Data

US 2023/0410616 A1 Dec. 21, 2023

(51) Int. Cl.
*G08B 13/08* (2006.01)

(52) U.S. Cl.
CPC .................................... *G08B 13/08* (2013.01)

(58) Field of Classification Search
CPC ............................ G08B 13/08; G08B 340/545
See application file for complete search history.

(56) References Cited

U.S. PATENT DOCUMENTS

| | | | |
|---|---|---|---|
| 3,986,183 | A | 10/1976 | Fujiwara |
| 4,296,410 | A | 10/1981 | Higgs et al. |
| 4,954,812 | A | 9/1990 | Lebron |
| 5,164,705 | A | 11/1992 | Dunagan et al. |
| D354,925 | S | 1/1995 | Eggers et al. |

(Continued)

FOREIGN PATENT DOCUMENTS

| | | | | |
|---|---|---|---|---|
| CA | 3100201 | A1 * | 11/2019 | ......... G06K 19/0723 |
| CN | 1645424 | A | 7/2005 | |

(Continued)

OTHER PUBLICATIONS

Vision Security: "Installation & Operation Manual ZD 2012", published Feb. 10, 2011.

(Continued)

*Primary Examiner* — Quan Zhen Wang
*Assistant Examiner* — Mancil Littlejohn, Jr.
(74) *Attorney, Agent, or Firm* — Nicholas Garner; Oyen Wiggs Green & Mutala LLP

(57) ABSTRACT

There is provided a security alarm system. The system includes an RFID tag mounted on a first of a window/door and framing thereof. The system includes a sensor with an RFID reader mounted on a second of the window/door and the framing. A distance between the sensor and the RFID tag varies as the window/door is opened. The sensor includes a signal range adjuster actuation of which alters the range within which the sensor can read the RFID tag. The system includes a control panel. The sensor signals the control panel to trigger an alarm when the distance between the sensor and the RFID tag increases beyond a threshold distance so altered and the sensor cannot read the RFID tag.

20 Claims, 23 Drawing Sheets

(56) References Cited

U.S. PATENT DOCUMENTS 5,434,500 A 7/1995 Hauck et al.
D383,078 S 9/1997 Carmi
5,714,932 A 2/1998 Castellon et al.
5,784,446 A 7/1998 Stuart
5,905,787 A 5/1999 Stuart
D417,165 S 11/1999 Takeda et al.
6,057,764 A 5/2000 Williams
D429,696 S 8/2000 Taylor
D434,387 S 11/2000 Taylor
6,185,294 B1 2/2001 Chornenky et al.
6,400,267 B1 6/2002 Gordon-Levitt et al.
6,519,208 B2 2/2003 Devries
6,577,238 B1 6/2003 Whitesmith et al.
6,940,016 B1 9/2005 Cornett et al.
7,023,327 B1 4/2006 Chen
7,079,034 B2 * 7/2006 Stilp .................... G08B 3/1083 340/568.1
7,135,959 B2 11/2006 Wagner et al.
7,215,088 B1 5/2007 Clark et al.
7,221,230 B2 5/2007 Partridge et al.
D561,058 S 2/2008 Taylor
7,417,535 B2 8/2008 Mathews et al.
7,600,694 B2 10/2009 Helt et al.
7,785,138 B2 8/2010 Bonnassieux et al.
8,410,937 B2 4/2013 Collins
8,442,797 B2 5/2013 Kim et al.
8,504,103 B2 8/2013 Ficquette
8,638,210 B2 1/2014 Simon et al.
D708,976 S 7/2014 Moeller
8,773,263 B2 * 7/2014 Thibault ................ G08B 13/08 200/61.93
D713,277 S 9/2014 Hasegawa et al.
8,933,789 B1 1/2015 Fink et al.
9,060,104 B2 6/2015 Scalisi
9,113,051 B1 8/2015 Scalisi
9,179,108 B1 11/2015 Scalisi et al.
D744,883 S 12/2015 Roberts et al.
9,202,359 B2 12/2015 Rauworth et al.
9,245,439 B2 1/2016 Lamb et al.
D764,335 S 8/2016 Thornton et al.
D778,184 S 2/2017 Kikstra et al.
D782,349 S 3/2017 Konotopskyi et al.
9,589,446 B1 3/2017 Dey et al.
D783,542 S 4/2017 Marsden
9,639,100 B2 5/2017 Storm et al.
9,659,470 B2 5/2017 Smith
D788,610 S 6/2017 Venth et al.
D788,625 S 6/2017 Hsieh et al.
9,695,015 B1 7/2017 Marinelli
D796,975 S 9/2017 Jou et al.
9,767,660 B1 9/2017 Skarda
9,799,182 B1 10/2017 Modi et al.
9,905,099 B2 2/2018 Carlson et al.
9,927,301 B2 3/2018 Peterson
9,959,745 B2 5/2018 Lamb et al.
D826,941 S 8/2018 Zhou et al.
10,062,533 B2 8/2018 Qureshi et al.
10,070,058 B2 9/2018 Siminoff et al.
10,072,985 B2 9/2018 Peterson
D841,504 S 2/2019 Alvarado et al.
10,210,356 B2 2/2019 Vechvittayakhlung
10,249,161 B2 4/2019 Carlson
D848,293 S 5/2019 Laurans et al.
10,290,447 B2 5/2019 Qureshi et al.
D852,071 S 6/2019 Laurans et al.
D852,074 S 6/2019 Laurans et al.
10,319,213 B1 6/2019 Conner et al.
10,600,293 B2 3/2020 McClintock
10,622,770 B2 4/2020 Parks
D892,659 S 8/2020 Carlson et al.
11,100,786 B2 8/2021 Dey et al.
11,295,584 B2 4/2022 Carlson et al.
11,341,829 B2 5/2022 Carlson et al.
11,557,184 B2 1/2023 Fisher
11,645,897 B2 5/2023 Carlson et al.
11,657,687 B2 5/2023 Thibault
11,749,077 B2 9/2023 Carlson et al.
11,783,655 B1 10/2023 Else et al.
2001/0030605 A1 10/2001 Novotny
2002/0086567 A1 7/2002 Cash, Jr.
2004/0085205 A1 5/2004 Yeh
2004/0095254 A1 5/2004 Maruszczak
2004/0121648 A1 6/2004 Voros
2004/0178889 A1 9/2004 Buckingham et al.
2004/0182096 A1 9/2004 Alles
2004/0212500 A1 10/2004 Stilp
2004/0260407 A1 12/2004 Wimsatt
2005/0024207 A1 * 2/2005 Schebel ................. G08B 13/08 340/539.1
2005/0096587 A1 5/2005 Santini, Jr. et al.
2005/0125083 A1 6/2005 Kiko
2005/0152323 A1 7/2005 Bonnassieux et al.
2005/0161517 A1 7/2005 Helt
2005/0179545 A1 8/2005 Bergman et al.
2005/0248443 A1 11/2005 Steinetz et al.
2006/0071762 A1 4/2006 Lombardo
2006/0220795 A1 10/2006 Limbachiya
2007/0052531 A1 3/2007 Mathews et al.
2007/0279226 A1 12/2007 Whitesmith et al.
2008/0290864 A1 11/2008 Latraverse
2008/0297339 A1 12/2008 Mathews et al.
2009/0042604 A1 2/2009 Ficquette
2009/0201160 A1 8/2009 Acrey
2009/0201209 A1 8/2009 Boyle
2010/0102907 A1 4/2010 Schebel et al.
2010/0308990 A1 12/2010 Simon et al.
2011/0004916 A1 1/2011 Schiffman et al.
2011/0057788 A1 3/2011 Talkington et al.
2011/0106996 A1 5/2011 Rosso
2011/0156905 A1 6/2011 Collins
2012/0002655 A1 1/2012 Bonnassieux et al.
2012/0089299 A1 4/2012 Breed
2012/0293310 A1 11/2012 Fitzgibbon et al.
2013/0009771 A1 1/2013 Simon et al.
2013/0048724 A1 2/2013 Burnside et al.
2013/0057404 A1 3/2013 Thibault
2013/0057405 A1 3/2013 Seelman et al.
2013/0079931 A1 3/2013 Wanchoo et al.
2013/0170532 A1 7/2013 Marozsak et al.
2013/0257611 A1 10/2013 Lamb et al.
2013/0316583 A1 11/2013 Scherer et al.
2014/0070922 A1 3/2014 Davis
2014/0097953 A1 4/2014 Jelveh et al.
2014/0244047 A1 8/2014 Oh et al.
2014/0265633 A1 9/2014 O
2014/0266669 A1 9/2014 Fadell et al.
2014/0267716 A1 9/2014 Child et al.
2014/0327526 A1 11/2014 Bess et al.
2014/0340222 A1 11/2014 Thornton et al.
2015/0199888 A1 7/2015 Shapira et al.
2015/0256665 A1 9/2015 Pera et al.
2015/0348385 A1 12/2015 Lamb et al.
2015/0381227 A1 12/2015 Browning et al.
2016/0044447 A1 2/2016 Tetreault
2016/0111878 A1 4/2016 Qureshi et al.
2016/0134930 A1 5/2016 Swafford
2016/0300468 A1 10/2016 Stricker et al.
2017/0084131 A1 3/2017 Harrison et al.
2017/0109984 A1 4/2017 Child et al.
2017/0195625 A1 7/2017 Mahar et al.
2017/0202369 A1 7/2017 Mercier et al.
2017/0236402 A1 8/2017 McGee
2017/0243456 A1 8/2017 Smith
2018/0025190 A1 1/2018 Vechvittayakhlung
2018/0137727 A1 5/2018 Barth et al.
2018/0365943 A1 12/2018 DiPoala
2019/0027875 A1 1/2019 Parks
2019/0096202 A1 3/2019 Seelman
2020/0315371 A1 10/2020 Ewing et al.
2020/0357253 A1 11/2020 Carlson et al.
2021/0209907 A1 7/2021 Carlson et al.
2021/0272431 A1 9/2021 Chavady

(56) References Cited

U.S. PATENT DOCUMENTS

| | | | |
|---|---|---|---|
| 2021/0327230 A1 | 10/2021 | Wang et al. | |
| 2022/0230216 A1 | 7/2022 | Buibas et al. | |

FOREIGN PATENT DOCUMENTS

| | | | | |
|---|---|---|---|---|
| CN | 1745225 | A | | 3/2006 |
| CN | 1787024 | A | * | 6/2006 |
| CN | 201780643 | U | | 3/2011 |
| CN | 103854001 | A | | 6/2014 |
| CN | 205281694 | U | | 6/2016 |
| CN | 106952431 | A | | 7/2017 |
| CN | 105931401 | B | | 6/2019 |
| DE | 20017433 | U1 | | 3/2001 |
| DE | 202014000574 | U1 | | 2/2014 |
| DE | 102013217366 | A1 | | 11/2014 |
| EP | 1860624 | A1 | | 11/2007 |
| GB | 2356077 | A | | 5/2001 |
| GB | 2461815 | B | | 7/2011 |
| KR | 20000060312 | A | | 10/2000 |
| NL | 1000644 | C2 | | 12/1996 |
| WO | 2003046855 | A1 | | 6/2003 |
| WO | 2016011564 | A1 | | 1/2016 |
| WO | 20180011754 | A1 | | 1/2018 |
| WO | 2019218050 | A1 | | 11/2019 |
| WO | 2020157701 | A1 | | 8/2020 |

OTHER PUBLICATIONS

WIPO, International Searching Authority, International Search Report dated Nov. 5, 2015 in International Patent Application No. PCT/CA2015/050711.

European Search Report completed Feb. 1, 2018 for EP 15 82 4924.

WIPO, International Searching Authority, International Search Report dated Jul. 23, 2019 in International Patent Application No. PCT/CA2019/000071.

Extended Supplementary European Search Report dated May 14, 2021 for European Patent Application No. EP 19 80 3339.

WIPO, International Searching Authority, International Search Report dated Aug. 9, 2021 in International Patent Application No. PCT/CA2020/051582.

“ISC West 2019” available Apr. 17, 2019, [online], [site visited Jan. 2, 2020]. Retrieved from Internet, URL: https://www.youtube.com/watch?v=U20ki9sfQAE (Year: 2019).

“AIS25BATR” from Digikey, https://www.digikey.com/en/products/detail/stmicroelectronics/AIS25BATR/16669231 archived page dated Aug. 27, 2022.

“AIS25BA: ultralow noise, wide bandwidth, 3-axis accelerometer with TDM interface for automotive applications”, datasheet, dated Jul. 18, 2022.

“MMC5603NJ” from Memsic, https://www.memsic.com/magnetometer-2, archived page dated Oct. 2, 2022.

“MMC5603NJ:±30 Gauss, Monolithic, High Performance, Low Cost 3-axis Magnetic Sensor”, datasheet, dated Jan. 17, 2022.

Resideo, “5870API-WH—Wireless Indoor Asset Protection Sensor, White”, https://www.resideo.com/us/en/pro/products/security/proseries/security-and-safety/asset-protection/5870api-wh-wireless-indoor-asset-protection-sensor-white-5870api-wh/, archived article dated Dec. 21, 2021.

“5870API Wireless Indoor Asset Protection”, Honeywell Home, dated 2019.

Extended European search report dated Dec. 11, 2023 for European Patent Application No. 20961779.4.

International Search Report for International Patent Cooperation Treaty Patent Application No. PCT/CA2025/050475, completed on Jul. 18, 2025 and mailed Aug. 6, 2025.

Newave, “Smart Shelf Overview May 2019”. Online PDF, May 14, 2019 (May 14, 2019), [online] [retrieved on Dec. 17, 2025 (Dec. 17, 2025)]. Retrieved from the Internet: https://newaverfid.com/sites/default/files/smartshelf-more-info/Smart%20Shelf%20Overview%20May%202019.pdf.

* cited by examiner

CUSTOMIZABLE SECURITY ALARM SYSTEM COMPRISING AN RFID TAG, AND METHOD OF INSTALLING THE SAME

BACKGROUND OF THE INVENTION

Field of the Invention

There is provided a security alarm system. In particular, there is provided a customizable security alarm system comprising an RFID tag, and a method of installing the same.

Description of the Related Art

International Patent Application Publication No. WO/2003/046855 A1 discloses a security sensor system. The security sensor system includes a window frame defining a window opening, a window sash movable relative to the window frame between open and closed positions, and a sensor unit embedded in the window frame. The sensor unit includes a housing having an inner end within the window frame, an outer end at a surface of the window frame, and a flexible ¼ wave wire antenna extending e.g. longitudinally of the window frame from the housing. The housing contains a sensor switch, a microprocessor, an RF transmitter and a battery for emitting signals to a master station or controller. The security sensor system also includes a magnet mounted in the window sash for actuating the sensor switch.

U.S. Pat. No. 6,577,238 to Whitesmith et al. discloses a system for monitoring the position of one or more RFID tags. The system has a detector incorporating circuitry for detecting changes in the range of an RFID tag from the detector and for triggering an alarm if a detected change in range of an RFID tag exceeds a predetermined threshold or if the RFID radio tag cannot be detected by the detector. Range may be detected, for example, by measuring the time of a returned radio signal from a tag, by measuring the strength of a returned radio signal from a tag, or by detecting changes in a periodic interval at which energy is transmitted by a tag.

BRIEF SUMMARY OF INVENTION

There is provided disclosed herein, and it is an object to provide, an improved security alarm system and method of installing the same.

There is accordingly provided a security alarm system. The system includes an RFID tag mounted on a first of a window/door and framing thereof. The system includes a sensor with an RFID reader mounted on a second of the window/door and the framing. A distance between the sensor and the RFID tag varies as the window/door is opened. The sensor includes a signal range adjuster actuation of which alters the range within which the sensor can read the RFID tag. The system includes a control panel. The sensor signals the control panel to trigger an alarm when the distance between the sensor and the RFID tag increases beyond a threshold distance so altered and the sensor cannot read the RFID tag.

There is also provided a method of installing a security alarm system. The system includes an RFID tag and a sensor with an RFID reader. The method includes coupling a first of the RFID tag and the sensor to a first of a window/door and framing thereof. The method includes coupling a second of the RFID tag and the sensor to a second of the window/door and the framing. The method includes opening the window/door to a user-determined distance. The method includes adjusting a maximum signal range of the sensor past which the sensor is unable to read the RFID tag to correspond to said user-determined distance. The method includes providing a control panel to which the sensor signals to trigger an alarm when the distance between the sensor and the RFID tag increases beyond said maximum signal range so adjusted.

There is further provided a method of installing a security alarm system according to another aspect. The method includes coupling a first of an RFID tag and a sensor with an RFID reader to a first of a window/door and framing thereof. The method includes coupling a second of the RFID tag and the sensor to a second of the window/door and the framing. The method includes determining whether the RFID reader is in range of the RFID tag whereby, if the RFID reader is not in range of the RFID tag, the method includes incrementally increasing the range of the RFID reader via a signal range adjuster until the sensor reads the RFID tag. The method includes providing a control panel to which the sensor signals to trigger an alarm if the distance between the sensor and the RFID tag increases thereafter and the RFID reader is no longer able to read the RFID tag.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
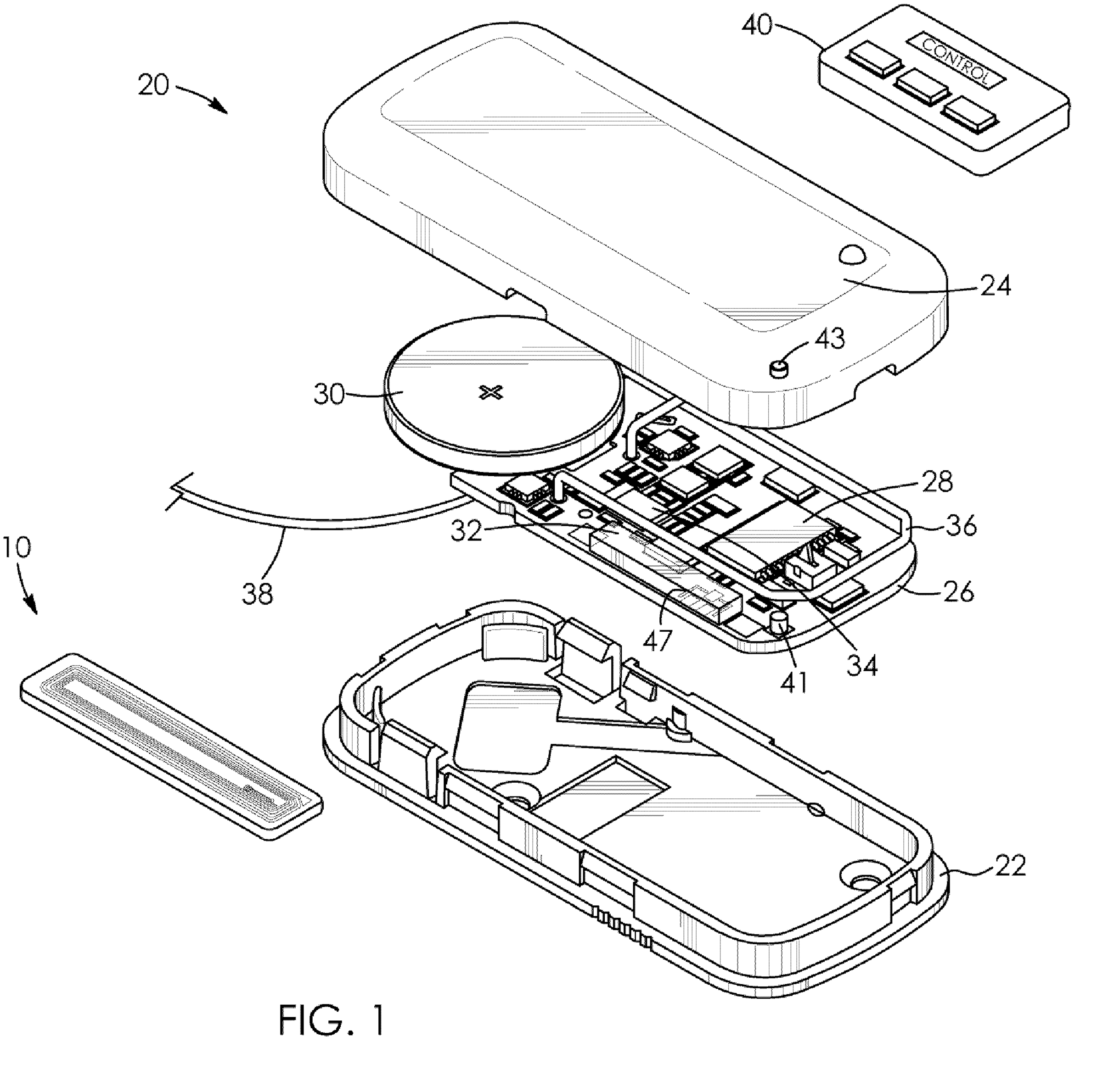
FIG. 1 is a perspective view of an RFID tag, a perspective view of a control panel of the security alarm system, and a perspective, exploded view of a sensor for a security alarm system.

Referring to the drawings and first to FIG. 1 there is shown a radio frequency identification (hereinafter "RFID") tag 10 and a sensor 20. The sensor includes a housing 22 having a cover 24. There is a circuit board 26 disposed within the housing 22. The sensor 20 includes a microprocessor 28 and a power source, in this example a coin cell battery 30, each mounted on the circuit board. The sensor 20 includes an RFID reader 32, a radio 34 and an antenna 36, each also mounted on the circuit board 26. The radio and antenna allow the sensor 20 to transmit and receive radio signals. The radio 34 and antenna 36 allow the sensor 20 to communicate with a control panel 40 as part of a wireless security alarm system. There is a wire 38 which may be electrically and releasably connected to the sensor 20. The wire allows the sensor 20 to communicate with the control panel 40 as part of a wired security alarm system. The sensor 20 communicates with the control panel to trigger an alarm.

The sensor 20 includes a signal range adjuster 41 mounted on the circuit board 26 and disposed in part within the housing 22. The signal range adjuster may be referred to as an electromagnetic field adjuster or an RFID range adjuster. The signal range adjuster is in this example manually actuated via a push-button 43 extending partially through the cover 24 of the housing. The signal range adjuster 41 is in communication with the microprocessor 28 and the RFID reader 32. The signal range adjuster functions to alter the strength/size of the electromagnetic field 45 seen in FIG. 2 generated by the RFID reader seen in FIG. 1. In this example the signal range adjuster 41 alters the amount of transmitter power output of the RFID reader 32. The signal range adjuster, in conjunction with the microprocessor 28, may enable power to the RFID reader to be selectively increased or decreased to expand or reduce the range of the RFID reader. In addition or alternatively, the signal range adjuster may alter the amount of oscillating current passing through the antenna 47 of the RFID reader. Actuation of the signal range adjuster 41 via push-button 43 seen in FIG. 1 alters the range within which the sensor can read the RFID tag 10.

FIGS. 2 to 8 show the RFID tag 10 and the sensor 20 being used as a window sensor for a window 50 in a first configuration of a security alarm system. The first configuration of the security alarm system is a wireless security alarm system in which the sensor 20 is mounted on a stile 52 of the window 50 and mounted on the bottom rail 58 of the window in part. However this is not strictly required and in other embodiments, the sensor may be mounted solely on the bottom rail and spaced-apart from the stile, or may be mounted solely on the stile and spaced-apart from the bottom rail.

The RFID tag 10 is mounted on framing 51, in this example a side jamb 54 of the window 50 near a sill 56 thereof. The window is movably linearly relative to the framing, in this example in a vertical direction along axis 53 seen in FIG. 2. The window 50 is fully closed in FIG. 2 with a bottom rail 58 of the window 50 abutting the sill 56 thereof. The sensor 20 is operating in a default setting with electromagnetic field 45 being well within range of and extending past the RFID tag 10 when the window is closed. The sensor is thus able to read the RFID tag when the window 50 is fully closed and signals that the window 50 is closed.

Figure 3:
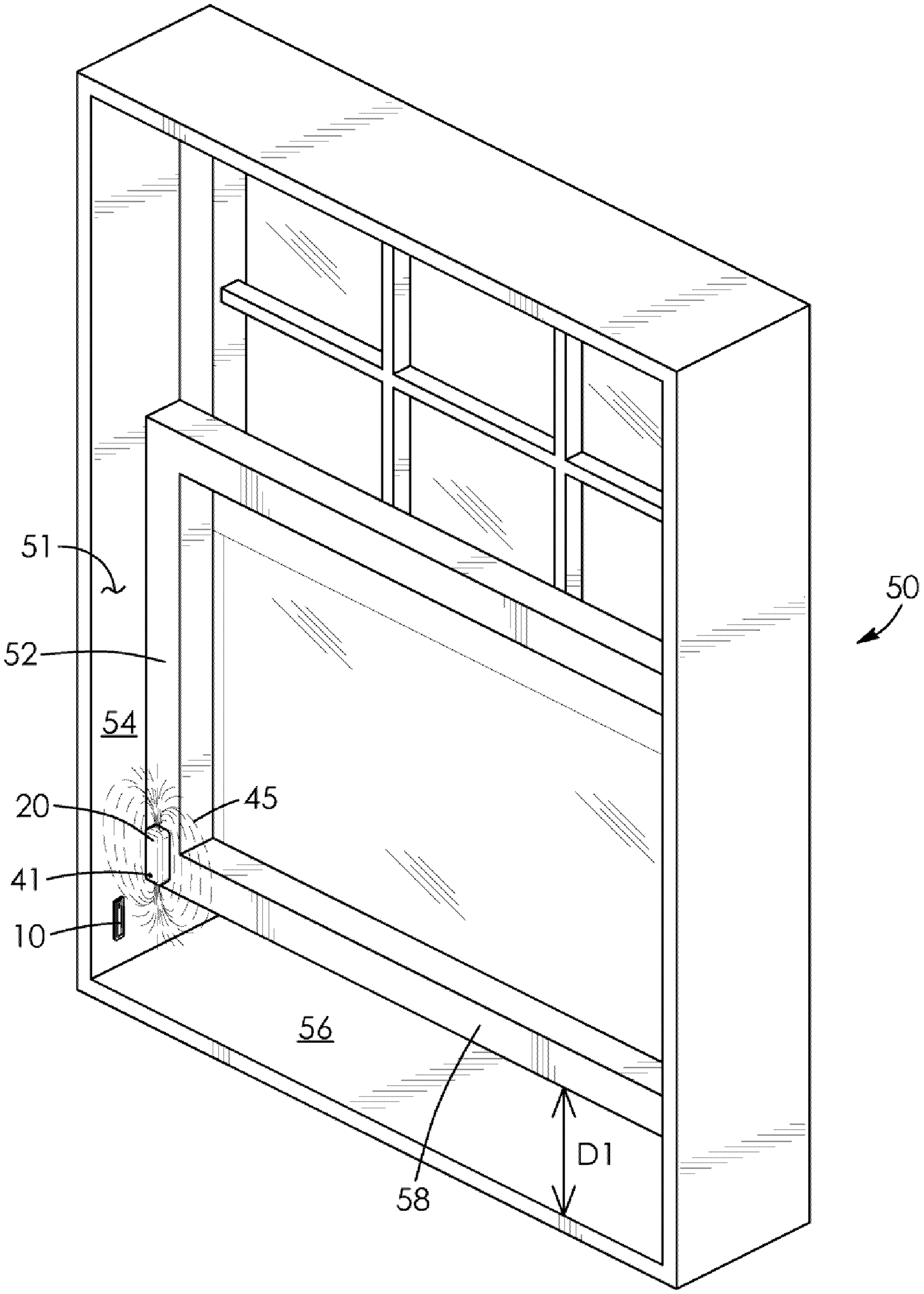
FIG. 3 is a perspective view showing the RFID tag and the sensor being used as the window sensor in the first configuration of the security alarm system with the window being open a distance D1, with the sensor being in its default setting, and with the distance D1 corresponding to the maximum signal range of the sensor in its default setting past which the sensor is unable to read the RFID tag.

Likewise, as shown in FIG. 3, the sensor 20 is also able to read the RFID tag 10 when the window 50 is open up to a threshold distance D1. The sensor continues to operate in its default setting, with the RFID tag just being within range of the electromagnetic field 45 of the sensor. It is desirable to allow the window 50 to be partially opened for ventilation but not opened enough to allow an intruder to enter through the window 50. The sensor 20 will accordingly not trigger an alarm when the sensor 20 is able to read the RFID tag 10.

Figure 4:
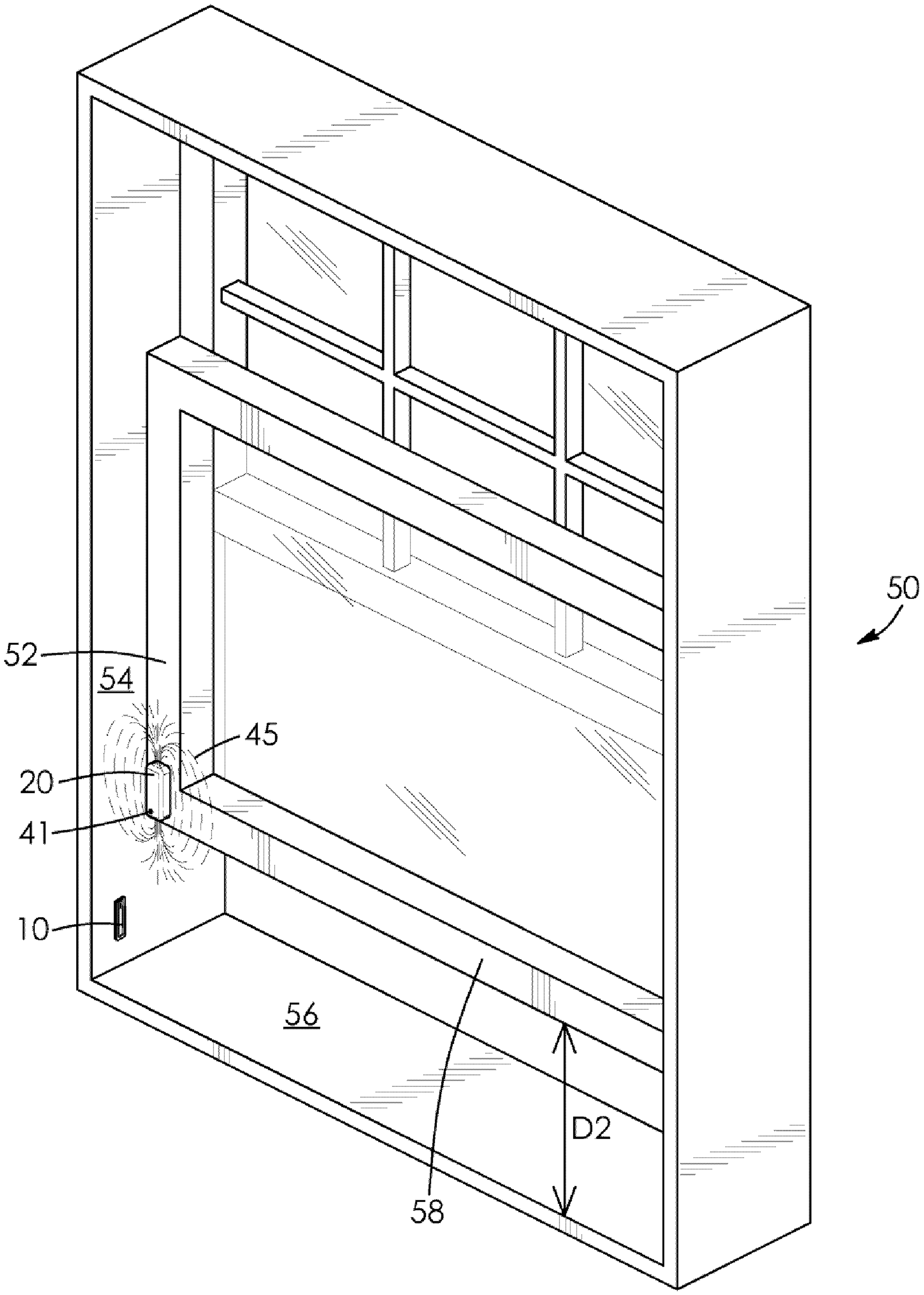
FIG. 4 is a perspective view showing the RFID tag and the sensor being used as the window sensor in the first configuration of the security alarm system with the window being open a distance D2, with the sensor operating in its default setting with the electromagnetic field thereof not in range of the RFID tag.

With reference to FIG. 4, when the window 50 is open to a distance D2, which is greater than the threshold distance D1 seen in FIG. 3, the sensor 20 in its default setting is no longer able to read the RFID tag 10 and an alarm is triggered.

Figure 5A:
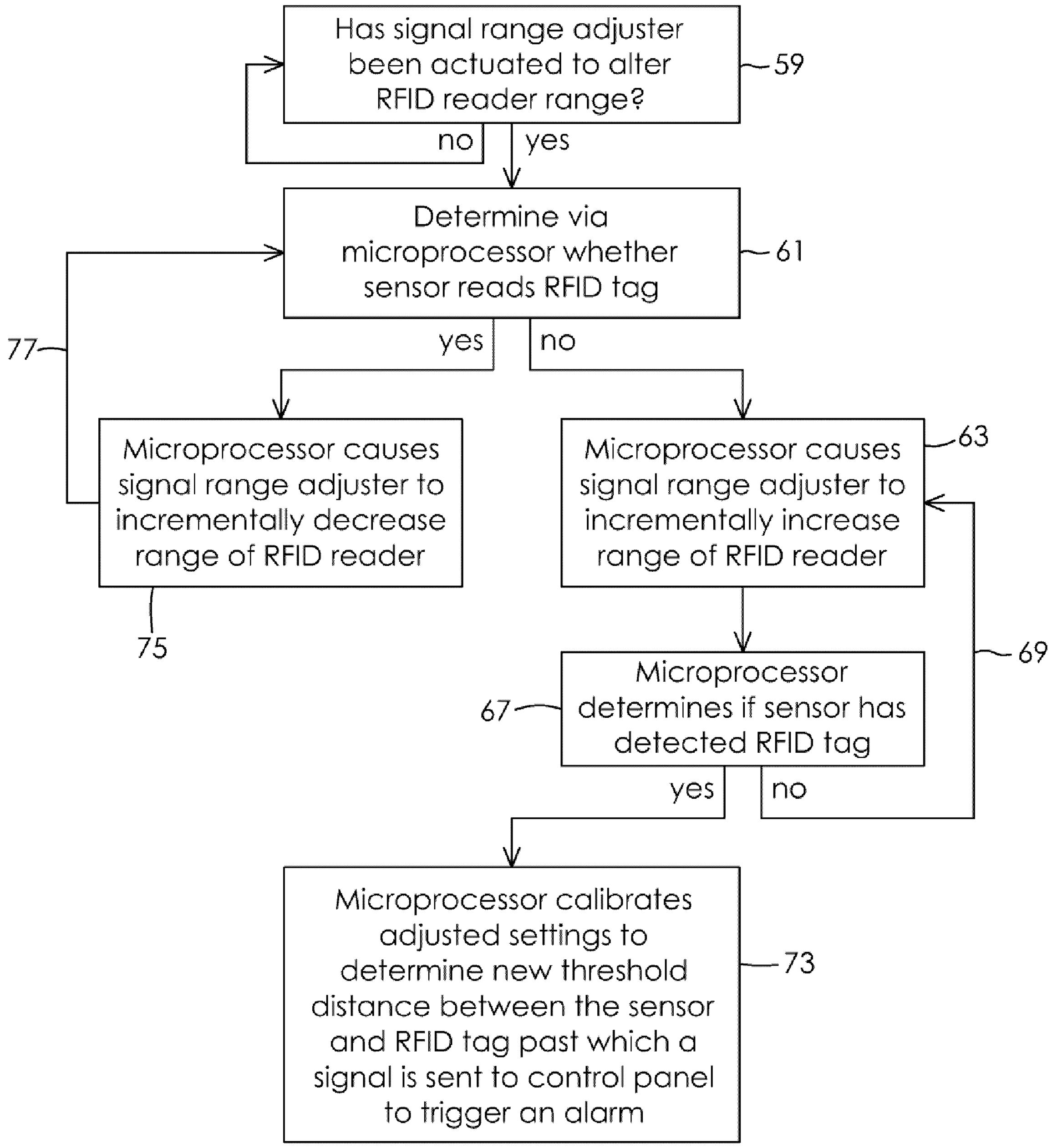
FIG. 5*a* is a flowchart of an algorithm of the security alarm system showing operation of a signal range adjuster and a microprocessor of the sensor, for installing and customizing the security alarm system according to a first aspect.

The sensor 20 as herein described enables the threshold distance past which the alarm is triggered to be customized. Referring to FIG. 5*a*, in order to alter the threshold distance and extent to which the window may be opened without triggering an alarm, the signal range adjuster is first actuated as seen by box 59 in FIG. 5*a*. Upon this actuation, the microprocessor 28 seen in FIG. 1 determines whether the sensor 20 reads the RFID tag 10, as generally shown by box 61 in FIG. 5*a*. If the sensor does not read the RFID tag, the microprocessor causes the signal range adjuster to incrementally increase the range of the RFID reader, as shown by box 63 in FIG. 5*a*, by incrementally strengthening/enlarging the electromagnetic field 65 of the sensor 20 in FIG. 6.

Figure 7:
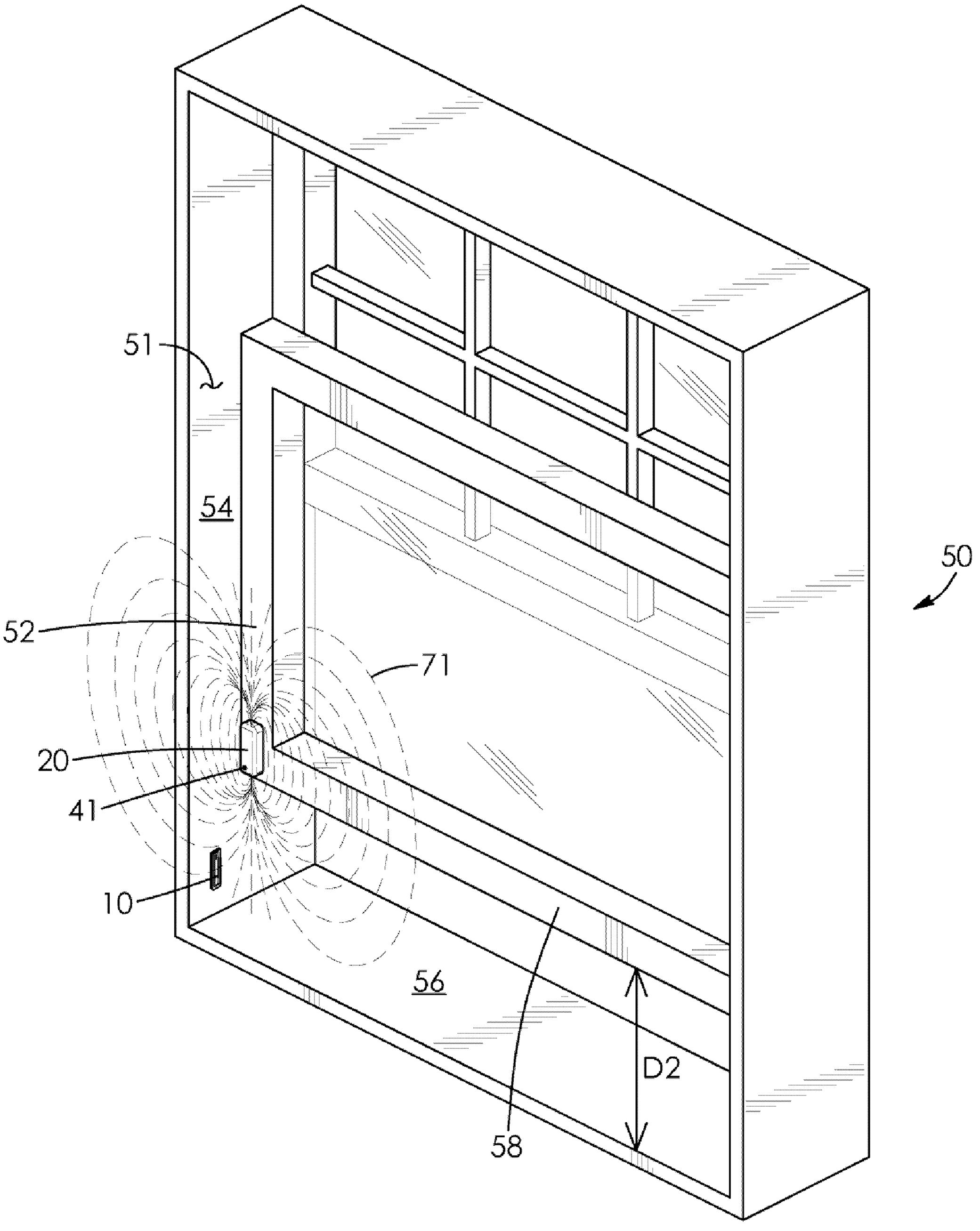
FIG. 7 is a perspective view similar to FIG. 6 showing the RFID tag and the sensor being used as the window sensor in the first configuration of the security alarm system with the window being open the distance D2, with the signal range adjuster having been actuated such that the sensor is operating with a further incrementally strengthened/enlarged electromagnetic field, and with said further incrementally strengthened/enlarged electromagnetic field being in range of the RFID tag.

The microprocessor next determines if the RFID reader so incrementally adjusted can now read the RFID tag as shown by box 67 in FIG. 5*a*. If no, the process is selectively repeated, as shown by numeral 69, until the sensor 20 reads the RFID tag 10 seen in FIG. 7. Referring to FIG. 7, the sensor so altered has a further incrementally increased/enlarged electromagnetic field 71 which now overlaps with and reads the RFID tag 10. Referring back to FIG. 5*a*, after the microprocessor causes the signal range adjuster to incrementally increase the range of the RFID reader until the sensor reads the RFID tag, the microprocessor calibrates these adjusted settings to determine a new/altered threshold distance D2 as seen in box 73. The sensor 20 signals the control panel 40 seen in FIG. 1 to trigger an alarm when the distance between the sensor and the RFID tag 10 increases beyond a threshold distance so altered and the sensor cannot read the RFID tag.

The sensor has thus been user-customized via actuation of its signal range adjuster 41 seen in FIG. 1 to enable the window 50 seen in FIG. 7 to open to a threshold distance D2, which is greater than threshold distance D1 seen in FIG. 3. The microprocessor may next render the signal range adjuster inoperable and/or render the signal adjuster inoperable until the signal range adjuster is actuated once more. The signal range adjuster 41 seen in FIG. 1 thus enables the extent to which the window is opened to be selectively increased as desired by the inhabitant or installer of the sensor 20.

Figure 2:
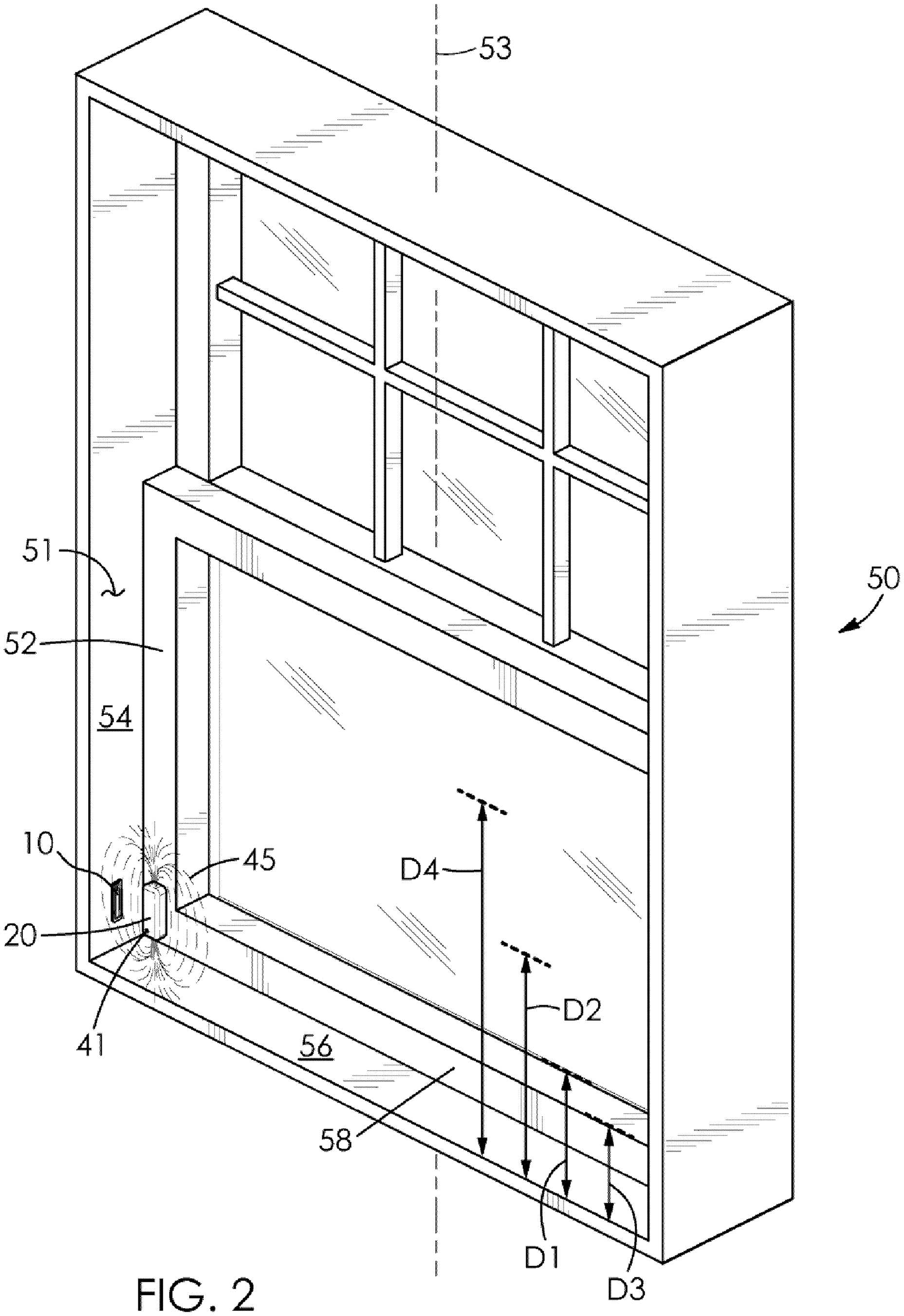
FIG. 2 is a perspective view showing the RFID tag and the sensor being used as a window sensor in a first configuration of the security alarm system with the window closed, and with the sensor operating on a default setting with an electromagnetic field well within range of and extending past the RFID tag.

Similarly, the signal range adjuster may be actuated and the window 50 thereafter fully opened up to a threshold distance D4 seen in FIG. 2. In this manner the range of the RFID reader may be enlarged such that a signal would not be sent to trigger an alarm regardless of the extent to which the window is opened. This may be convenient to the user where the user wants to open a window in a building while avoiding having to deactivate the security alarm system of the building as a whole to proceed. This may ensure that the building in non-occupied rooms is still secure.

Figure 8:
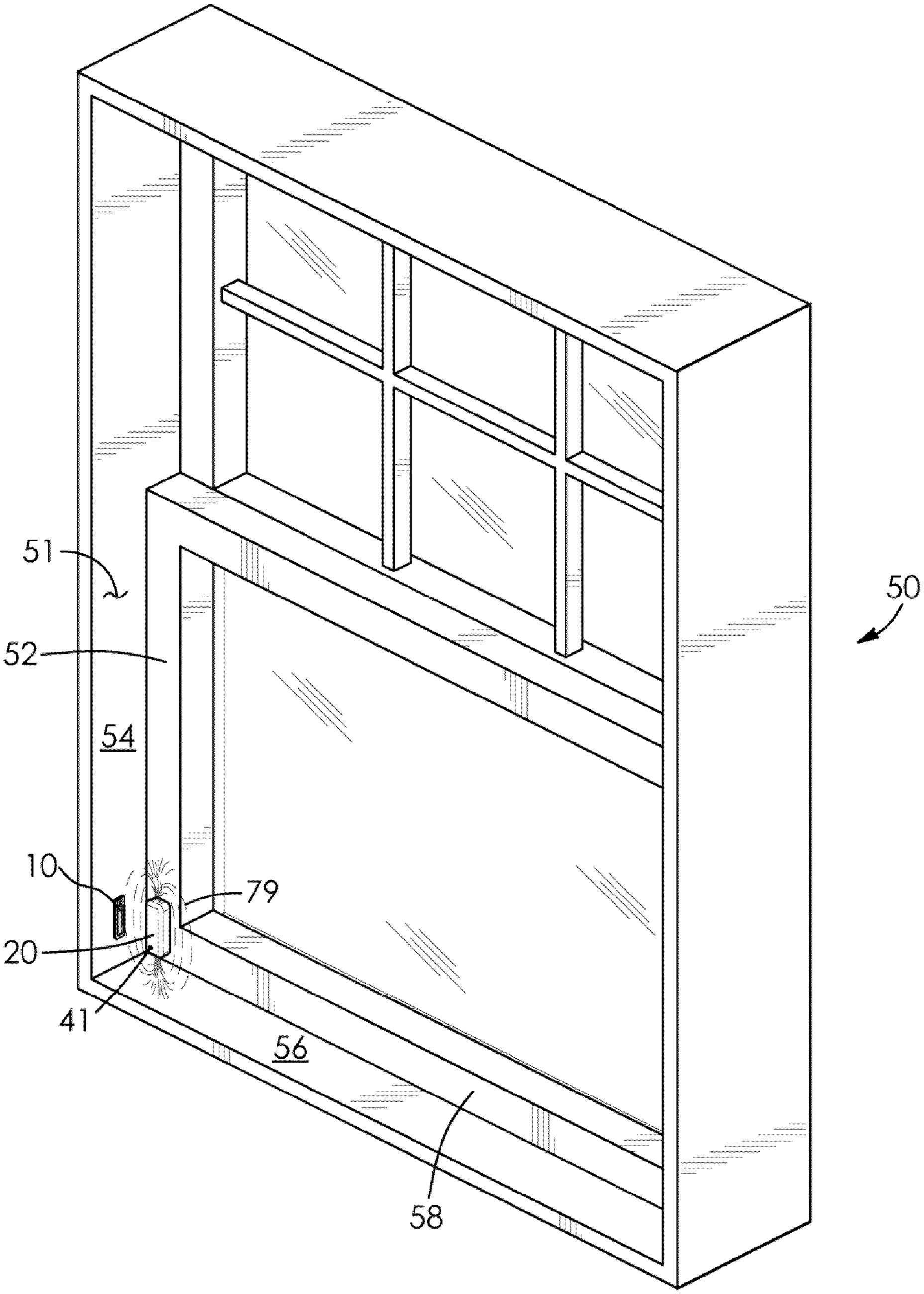
FIG. 8 is a perspective view similar to FIG. 2 showing the RFID tag and the sensor being used as the window sensor in the first configuration of the security alarm system with the window closed, with the signal range adjuster having been actuated such that the sensor is operating with an incrementally weakened/reduced electromagnetic field, with the maximum signal range of the sensor so adjusted corresponding to the sensor being able to read the RFID tag when the window is closed, and with opening of the window causing the sensor to be unable to read the RFID tag.

Conversely and referring to FIG. 8, the signal range adjuster may be actuated to restrict the extent to which the window 50 may be opened past which the alarm is triggered. The sensor 20 as herein described enables a user to select a reduced threshold distance, compared to threshold distance D1, or to provide no threshold distance whereby opening the window 50 causes a signal to be sent to trigger the alarm. The sensor 20 in its default setting seen in FIG. 2 enables the window to be opened to threshold distance D1. To reduce this distance, the user adjusts the window to a lower position, such as the closed position seen in FIG. 2. Referring to FIG. 5*a*, the signal range adjuster is next actuated as seen by box 59. If after the signal range adjuster is actuated the microprocessor determines that the sensor reads the RFID tag, which is the case where the window 50 is in the closed position seen in FIG. 2, the microprocessor causes the signal range adjuster to incrementally decrease as seen by box 75 in FIG. 5*a*.

The process may be selectively repeated, as shown by numeral 77, until the sensor 20 no longer reads the RFID tag. Thereafter the microprocessor causes the signal range adjuster to incrementally increase the range of the RFID reader, as seen by box 63. As seen in FIG. 8, the sensor 20 so altered has an incrementally reduced/smaller electromagnetic field 79 which now just barely overlaps with and reads the RFID tag 10. Referring back to FIG. 5*a*, after the microprocessor causes the signal range adjuster to incrementally increase the range of the RFID reader until the sensor reads the RFID tag, the microprocessor calibrates these adjusted settings to determine a new/altered threshold distance as seen in box 73 which may correspond to the window always being closed, for example.

The sensor 20 has thus been user-customized via actuation of its signal range adjuster 41 seen in FIG. 1 to send a signal to trigger an alarm when the window is opened at all in this example. Actuation of the signal range adjuster when the window is closed thus causes the control panel to trigger the alarm when the window is opened. The microprocessor may next render the signal range adjuster inoperable and/or render the signal adjuster inoperable until the signal range adjuster is actuated once more.

Figure 5B:
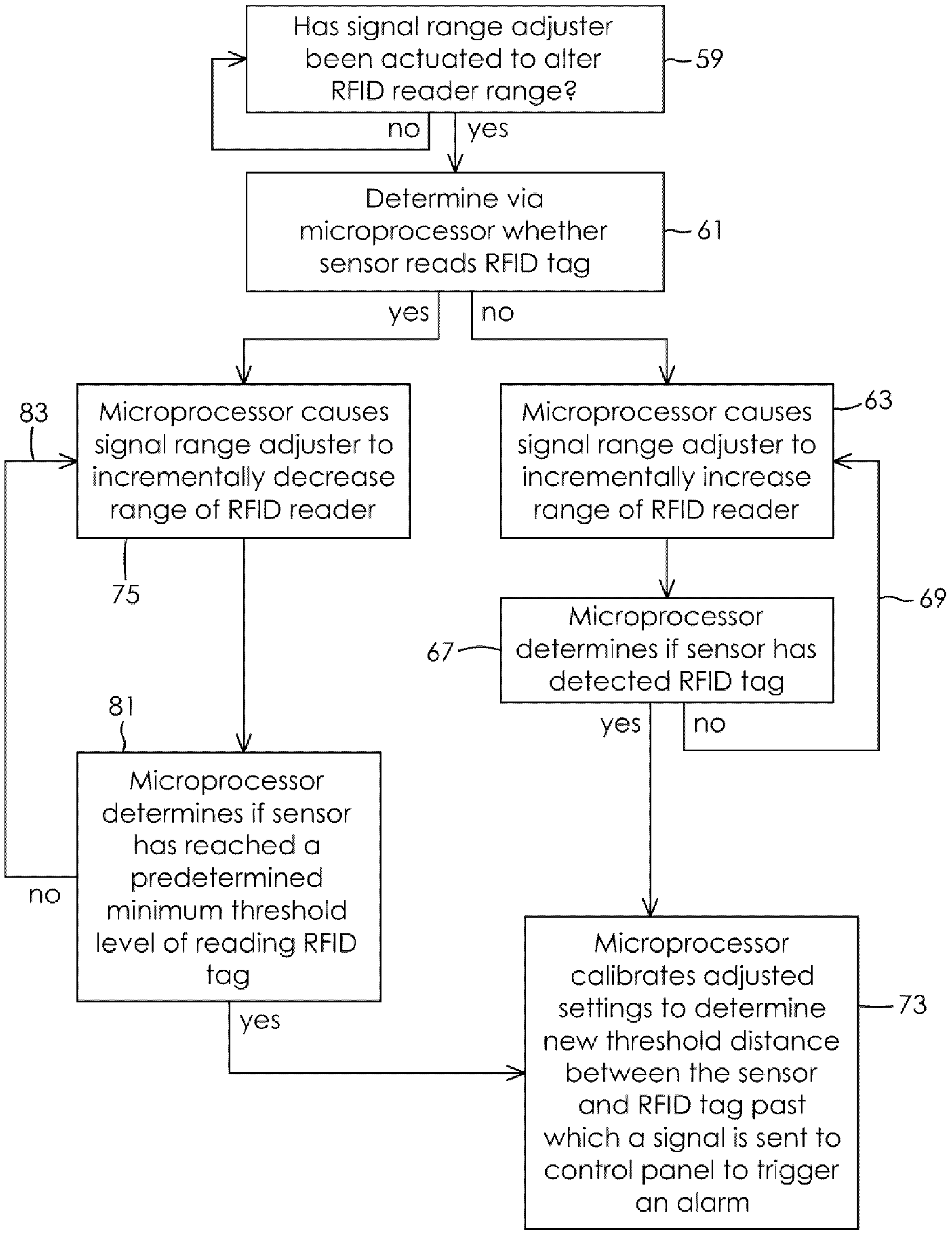
FIG. 5*b* is a flowchart of an algorithm of the security alarm system showing operation of a signal range adjuster and a microprocessor of the sensor, for installing and customizing the security alarm system according to a second aspect.

Alternatively and referring to FIG. 5*b*, after the microprocessor incrementally decreases the range of the RFID reader as seen in box 75, the microprocessor may determine if the sensor has reached a predetermined minimum threshold level of reading the RFID tag, as seen by box 81. If no, the process of incrementally decreasing the range of the RFID reader increases, as shown by arrow 83. If the microprocessor does determine that the sensor has reached a predetermined minimum threshold level of reading the RFID tag, then the microprocessor calibrates these adjusted settings to determine a new/altered threshold distance as seen in box 73 which may correspond to the window always being closed, for example.

Similarly, the signal range adjuster may be actuated with the window being positioned at a threshold distance D3 seen in FIG. 2, which is less than threshold distance D1. This may be convenient to the user where the user wants to open a window to a level less than the default setting of the sensor.

The signal range adjuster 41 seen in FIG. 1 thus enables the extent to which the window 50 seen in FIG. 8 is open without triggering the alarm to be customized. Selective actuation of the signal range adjuster enables the extent to which the window is open without triggering the alarm to vary. Selective actuation of the signal range adjuster enables a user-determined extent to which the window is open past which the alarm is triggered, to vary incrementally from a fully closed position of the window 50 seen in FIG. 2 towards/to a fully open position of the window.

Actuation of the signal range adjuster while or prior to opening the window may enable the window 50 to be opened without triggering the alarm.

Figure 6:
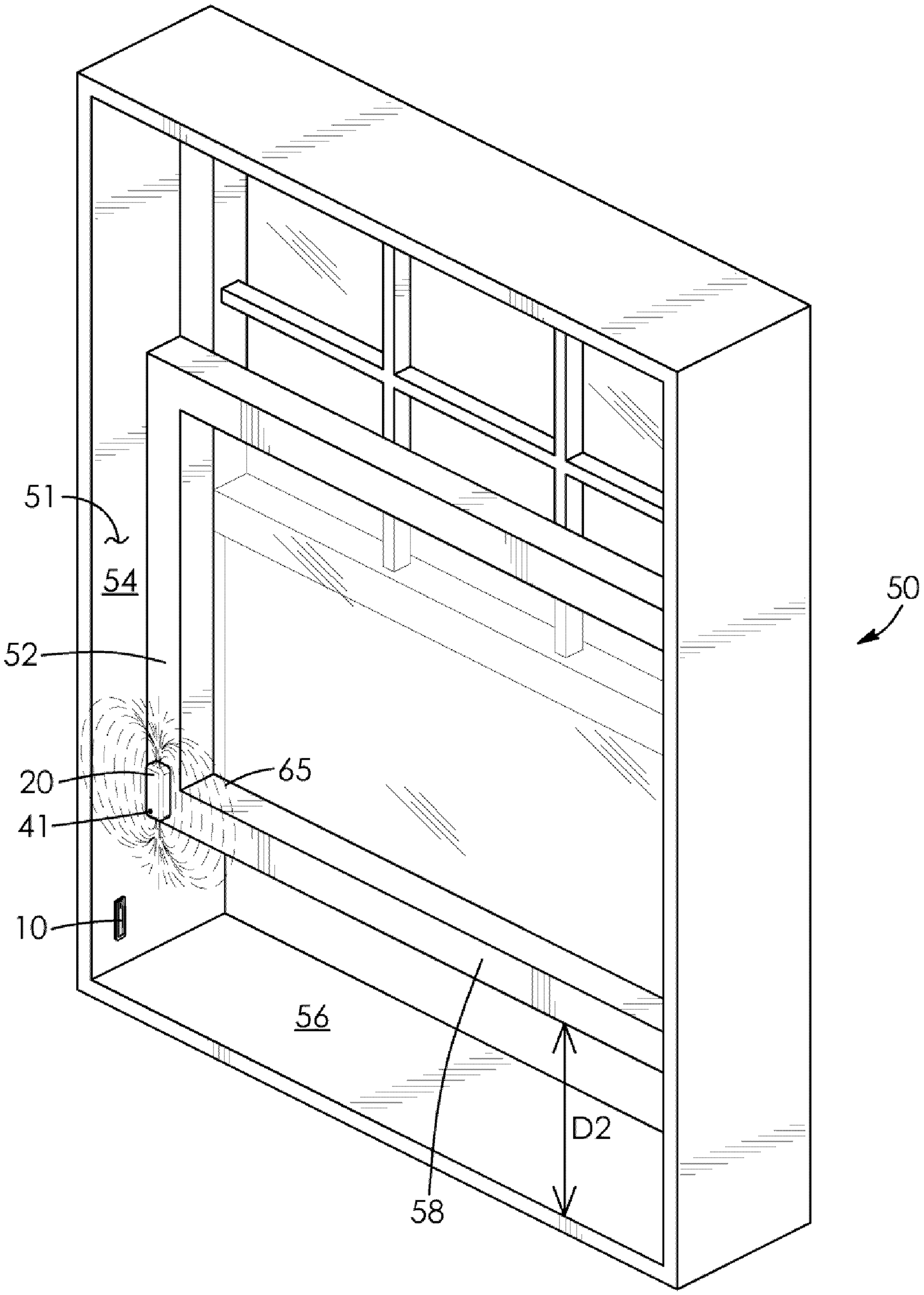
FIG. 6 is a perspective view similar to FIG. 4 showing the RFID tag and the sensor being used as the window sensor in the first configuration of the security alarm system with the window being open the distance D2, with the signal range adjuster having been actuated such that the sensor is operating with an incrementally strengthened/enlarged electromagnetic field, and with said incrementally strengthened/enlarged electromagnetic field not in range of the RFID tag.

There is also provided a method of installing a security alarm system. Referring to FIG. 2, the method includes coupling a first of the RFID tag 10 and the sensor 20 to a first of the window 50 and framing 51 thereof. The method includes coupling a second of the RFID tag and the sensor to a second of the window and the framing. In this example the RFID tag is coupled to framing 51 and the sensor is coupled to window 50. Referring to FIG. 6, the method includes opening the window/door 50 to a user-determined position D2. The method includes adjusting a maximum signal range of the sensor 20 past which the sensor is unable to read the RFID tag to correspond to the user-determined position. In this example, the maximum signal range is adjusted by actuating the signal range adjuster 41, with the microprocessor 28 seen in FIG. 1, and then following the steps set out in FIG. 5*a* and as described above. The method includes providing control panel 40 (seen in FIG. 1) to which the sensor 20 signals to trigger an alarm when the distance between the sensor and the RFID tag increases beyond said maximum signal range so adjusted. The method further includes opening the window/door to facilitate ventilation and inhibit an intruder from passing through the window/door.

According to another aspect, there is further provided a method of installing the security alarm system. Referring to FIG. 2, the method includes coupling a first of the RFID tag 10 and the sensor 20 to a first of window 50 and framing 51 thereof. The method includes coupling a second of the RFID tag and the sensor to a second of the window and the framing. In this example the RFID tag is coupled to framing 51 and the sensor is coupled to window 50. Referring to FIG. 6, the method includes determining whether the RFID reader 32 is in range of the RFID tag 10, in this example via microprocessor 28 seen in FIG. 1. If the RFID reader is not in range of the RFID tag, the method includes incrementally increasing the range of the RFID reader via signal range adjuster 41 until the sensor reads the RFID tag via the steps set out in FIG. 5*a*. The method includes providing control panel 40 to which the sensor signals to trigger an alarm if the distance between the sensor and the RFID tag increases thereafter and the RFID reader is no longer able to read the RFID tag.

As described above, if the RFID reader 32 seen in FIG. 1 is in range of the RFID tag 10 after the determining step, the method includes incrementally decreasing the range of the RFID reader via the signal range adjuster until the distance between the sensor and the RFID tag equals to a threshold distance past which the sensor signals to the control panel to trigger the alarm as set out in FIG. 5*b*. Alternatively, if the RFID reader is in range of the RFID tag after the determining step, the method includes incrementally decreasing until the sensor no longer reads the RFID tag and thereafter incrementally increasing the range of the RFID reader via the signal range adjuster until the sensor reads the RFID tag once more as set out in FIG. 5*a*.

Figure 9:
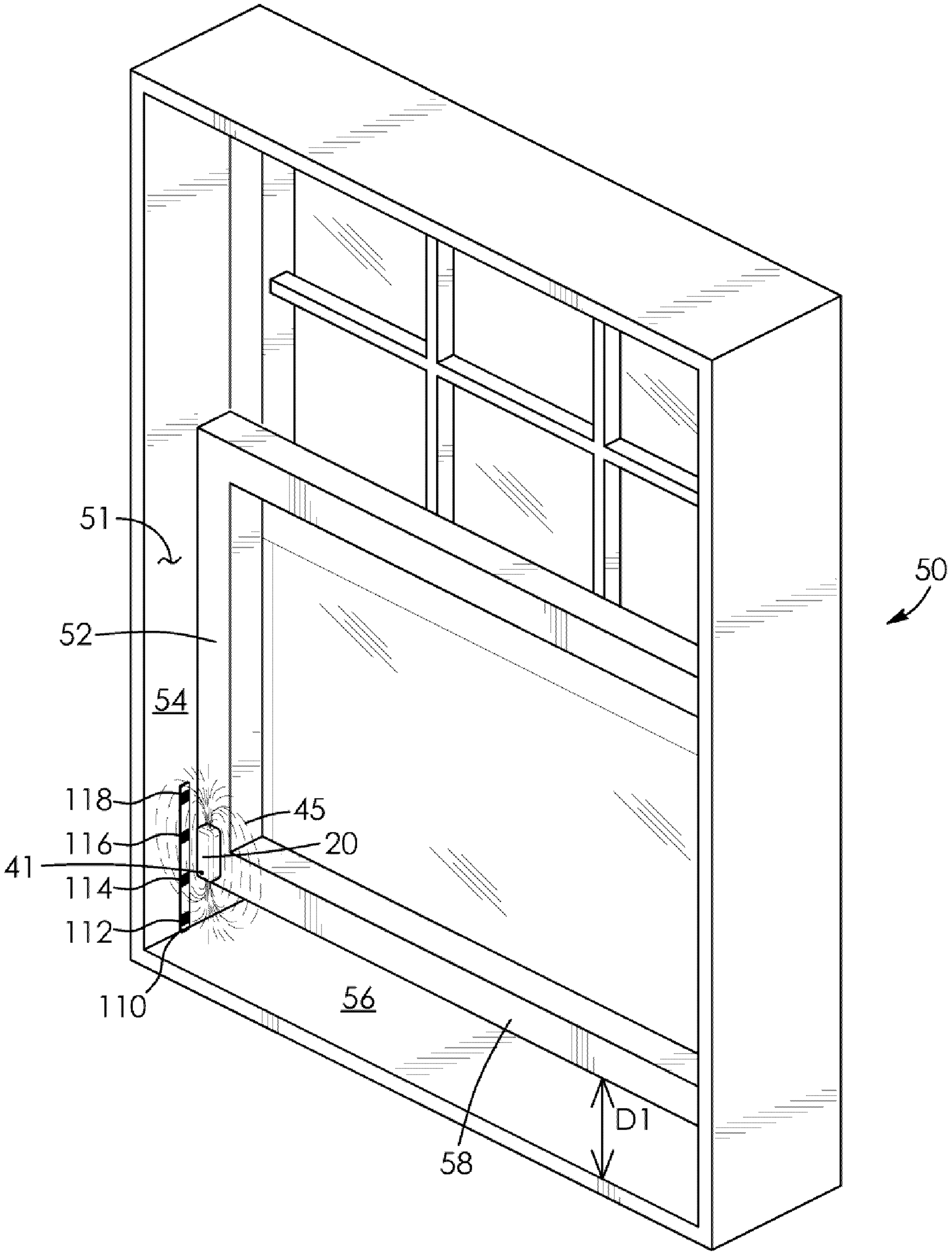
FIG. 9 is a perspective view showing a substrate strip with a plurality of RFID tags thereon and showing the sensor of FIG. 1 being used as a window sensor in a second configuration of a security alarm system, with the window being open the distance D1, and with the sensor being shown in its default setting.

FIG. 9 shows a substrate strip 110 with a plurality of RFID tags, namely a first RFID tag 112, a second RFID tag 114, a third RFID tag 116, and a fourth RFID tag 118. The substrate strip 110 and the sensor 20 are used as a window sensor for window 50 in a second configuration of a security alarm system. The second configuration of the security alarm system is a wireless security alarm system in which the sensor 20 is mounted on the stile 52 of the window 50 and the substrate strip 110 is mounted on framing 51, in this example the side jamb 54 of the window 50 near the sill 56 thereof.

The sensor is able to read at least the first RFID tag 112 when the window is fully closed. The sensor 20 is no longer able to read the first RFID tag when the window is open a first threshold distance D1. The sensor 20 is able to read at least the second RFID tag 114 when the window/door is open to the first threshold distance D1 and signals the control panel that the window/door is open to the first said threshold distance. When the window/door is open to a second threshold distance (not shown), which is greater than the first threshold distance, the sensor is no longer able to read the second RFID tag. The sensor 20 is able to read at least the third RFID tag 116 when the window is open to the second threshold distance and signals the control panel that the window is open to the second said threshold distance. The security alarm system thereby determines how much the window is open. The control panel 40 seen in FIG. 1 or other component of the security alarm system is further configured to communicate wirelessly with a handheld device to remotely provide a homeowner with information regarding the extent to which the window is opened thereby and with information regarding the status of the security alarm system.

The sensor 20 includes a signal range adjuster 41 and otherwise operates in a substantially similar manner to the sensor 20 described in FIGS. 1 to 8 above.

Figure 10:
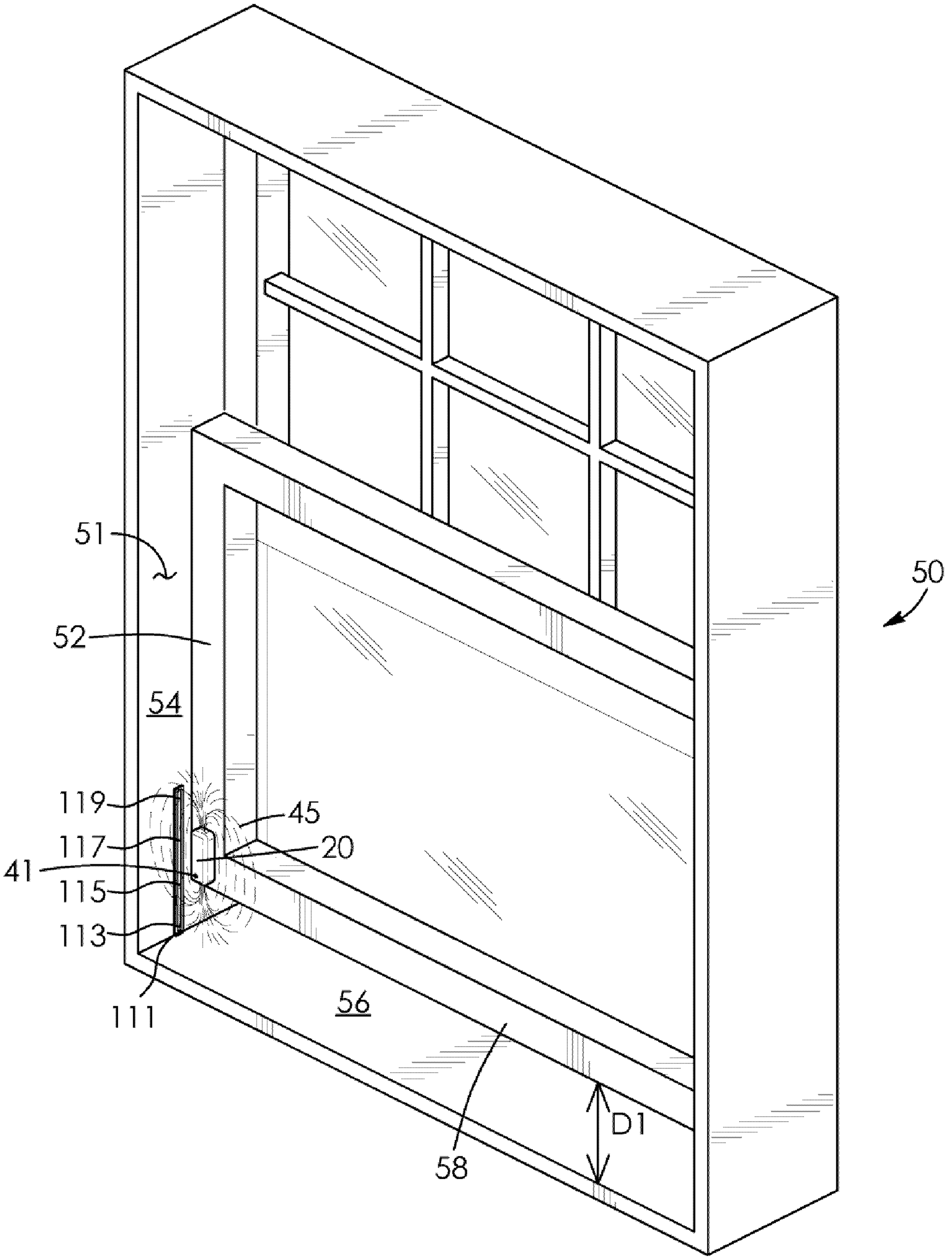
FIG. 10 is a perspective view showing an elongate RFID tag and the sensor of FIG. 1 being used as a window sensor in a third configuration of a security alarm system, with the window being open the distance D1, and with the sensor being shown in its default setting.

FIG. 10 shows an elongate RFID tag 111 instead of a substrate strip, with a plurality of subsections 113, 115, 117 and 119 employed to determine how much the window is open instead of a plurality of RFID tags. The elongate RFID tag and the sensor 20 are used as a window sensor for window 50 in a third configuration of a security alarm system. The third configuration of the security alarm system is a wireless security alarm system in which the sensor 20 is mounted on the stile 52 of the window 50 and the elongate RFID tag 111 is mounted on framing 51, in this example the side jamb 54 of the window 50 near the sill 56 thereof. The elongate RFID tag operates in a similar manner to the substrate strip with RFID tags of FIG. 9, with each subsection 113, 115, 117 and 119 of the elongate RFID tag performing a similar function to a corresponding RFID tag 112, 114, 116 and 118 for the substrate strip 110 as described for FIG. 9 above. The sensor 20 includes signal range adjuster 41 and otherwise operates in a substantially similar manner to the sensor 20 described in FIGS. 1 to 8 above.

Figure 11:
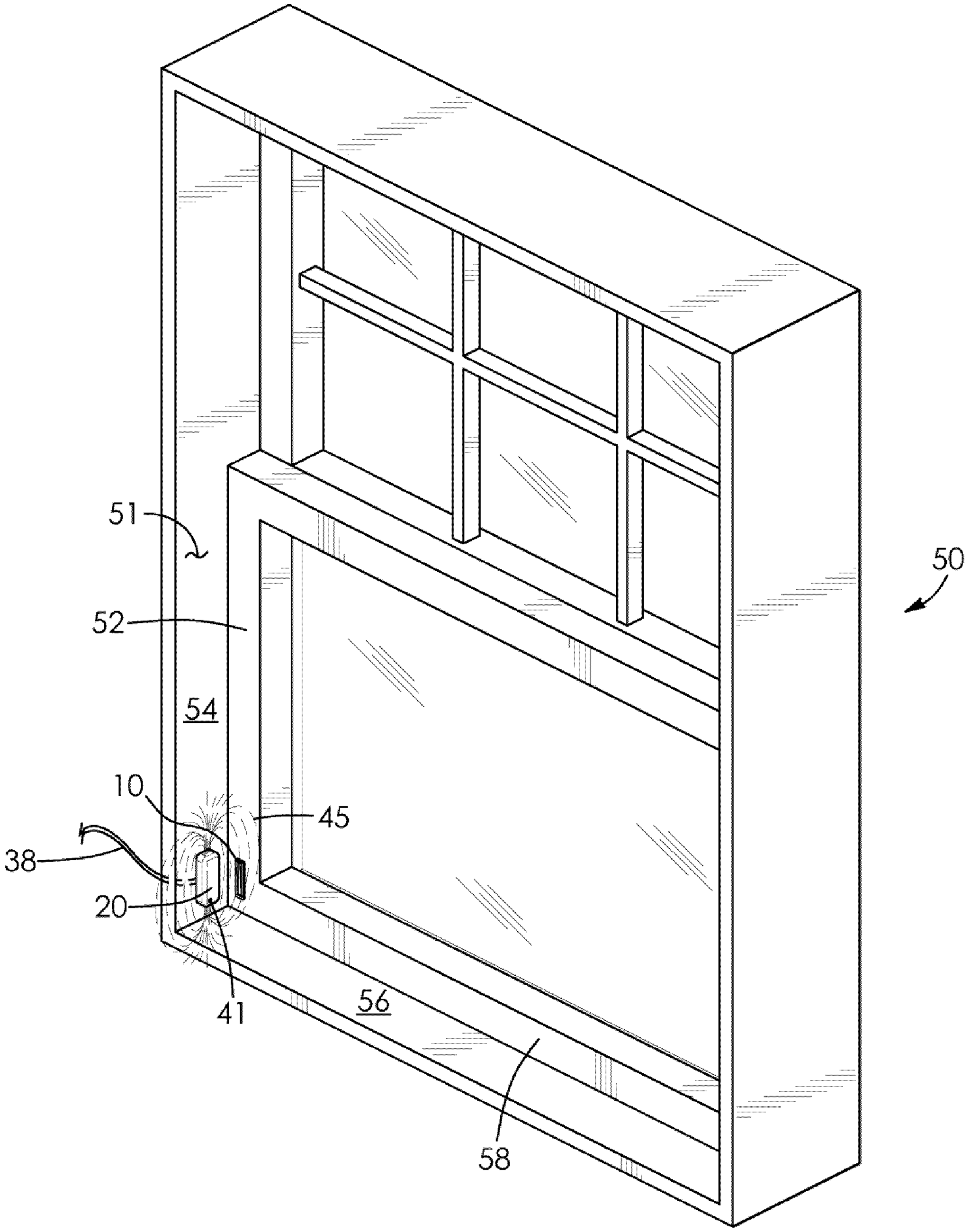
FIG. 11 is a perspective view showing the RFID tag and the sensor being used as a window sensor in a fourth configuration of a security alarm system, with the window closed, and with the sensor being shown in its default setting.

FIG. 11 shows the RFID tag 10 and the sensor 20 being used as a window sensor for window 50 in a fourth configuration of a security alarm system. The fourth configuration of the security alarm system is a wired security alarm system in which the RFID tag 10 is mounted on the stile 52 of the window 50 and the sensor is mounted on framing 51, in this example the side jamb 54 of the window 50 near the sill 56 thereof. This allows the sensor 20 to be wired in the fourth configuration of the security alarm system. The sensor 20 includes signal range adjuster 41 and otherwise operates in a substantially similar manner to the sensor 20 described in FIGS. 1 to 8 above.

Figure 12:
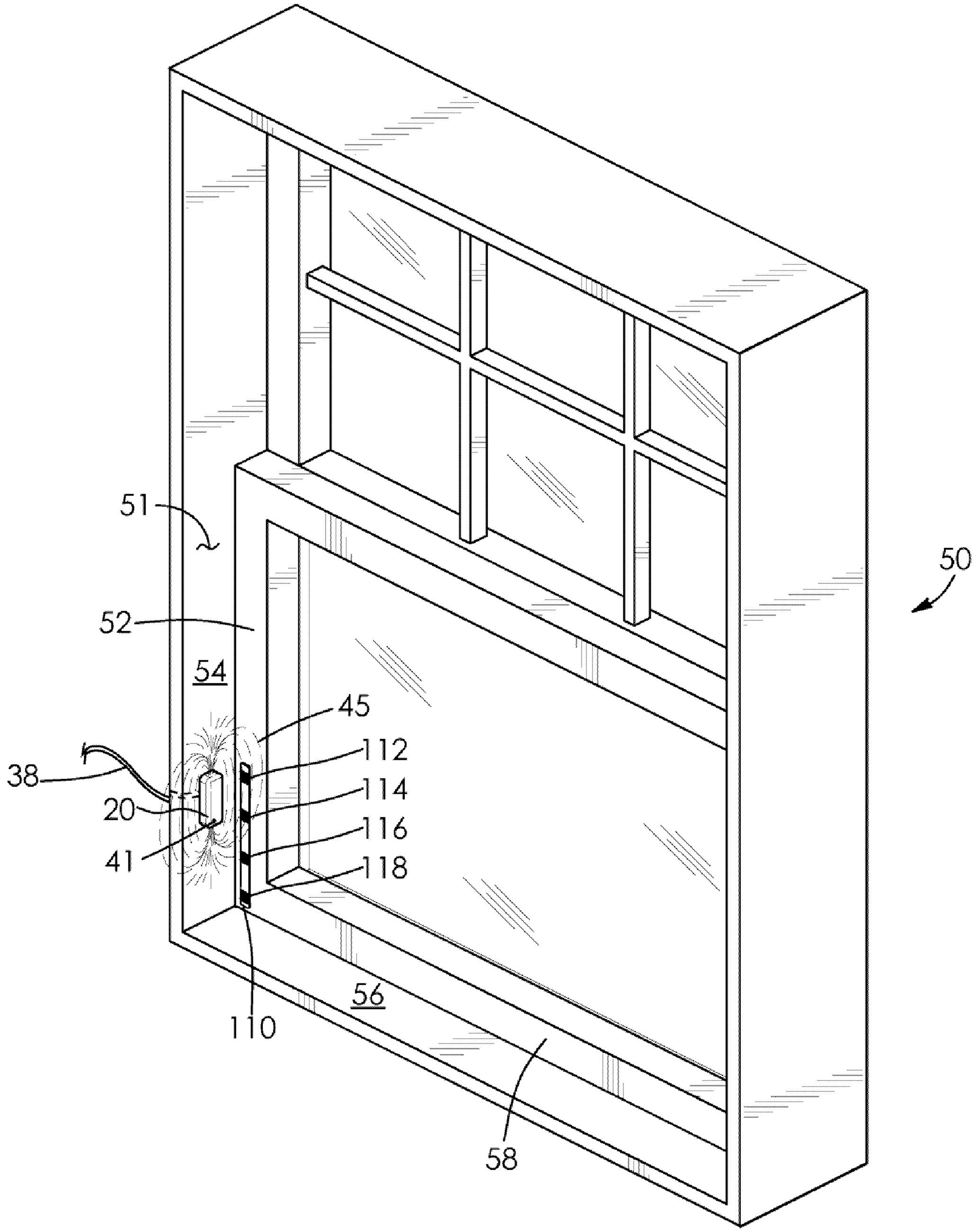
FIG. 12 is a perspective view showing the substrate strip and the sensor being used as a window sensor in a fifth configuration of a security alarm system, with the window closed, and with the sensor being shown in its default setting.

FIG. 12 shows the substrate strip 110 with RFID tags 112, 114, 116 and 118, and the sensor 20 being used as a window sensor for window 50 in a fifth configuration of a security alarm system. The fifth configuration of the security alarm system is a wired security alarm system in which the substrate strip 110 is mounted on the stile 52 of the window 50 and the sensor 20 is mounted on framing 51, in this example the side jamb 54 of the window 50 near the sill 56 thereof. This allows the sensor 20 to be wired in the fifth configuration of the security alarm system and otherwise operates in a substantially similar manner as that set out in FIG. 9. The sensor 20 includes signal range adjuster 41 and otherwise operates in a substantially similar manner to the sensor 20 described in FIGS. 1 to 8 above.

Figure 13:
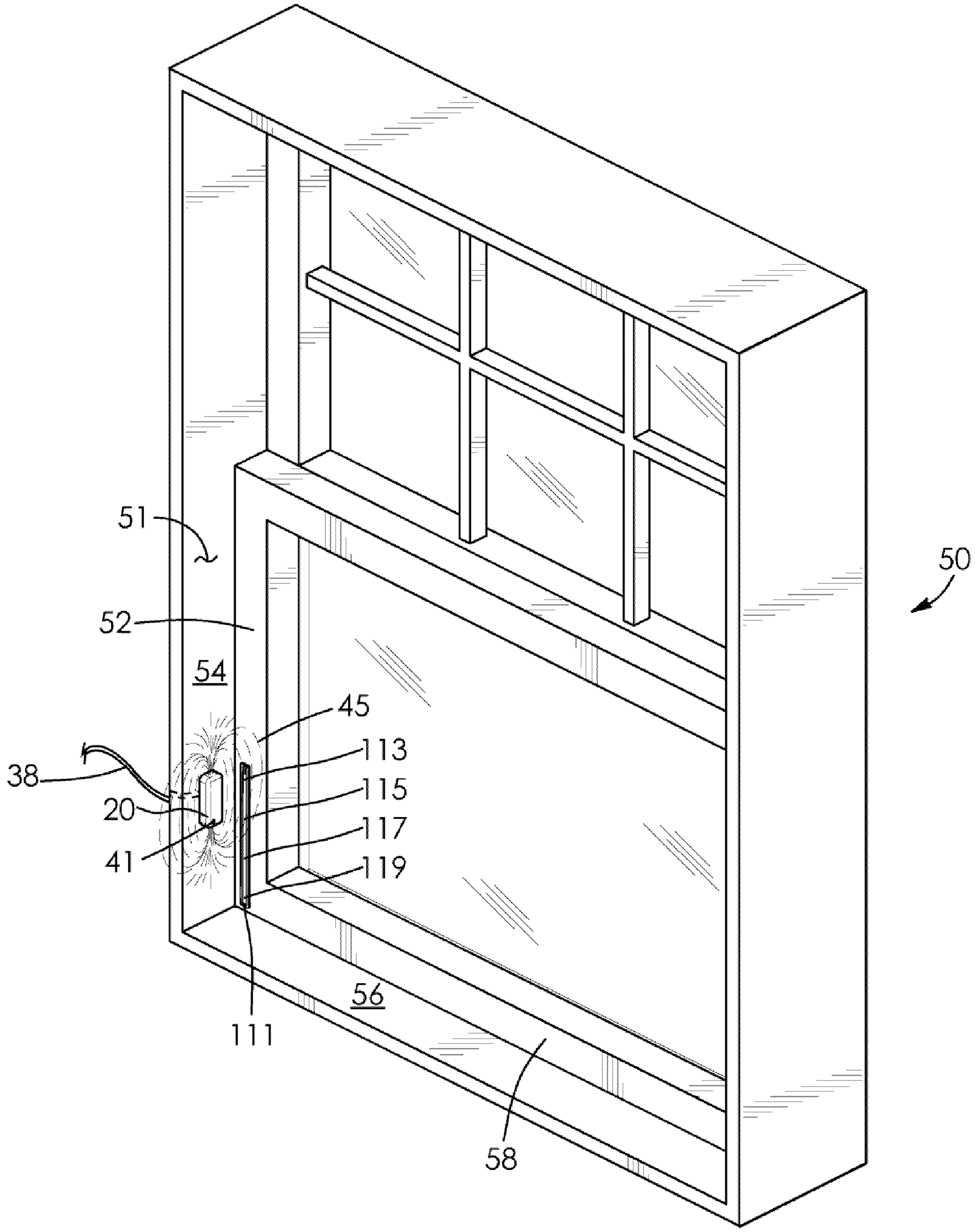
FIG. 13 is a perspective view showing the elongate RFID tag and the sensor being used as a window sensor in a sixth configuration of a security alarm system, with the window closed, and with the sensor being shown in its default setting.

FIG. 13 shows the elongate RFID tag 111 and the sensor 20 being used as a window sensor for window 50 in a sixth configuration of a security alarm system. The sixth configuration of the security alarm system is a wired security alarm system in which the elongate RFID tag 111 is mounted on the stile 52 of the window 50 and the sensor 20 is mounted on framing 51, in this example the side jamb 54 of the window 50 near the sill 56 thereof. This allows the sensor 20 to be wired in the sixth configuration of the security alarm system and otherwise operates in a substantially similar manner as that set out in FIG. 10. The sensor 20 includes signal range adjuster 41 and otherwise operates in a substantially similar manner to the sensor 20 described in FIGS. 1 to 8 above.

FIGS. 14 to 17 show the RFID tag 10 and the sensor 20 being used as a door sensor for a door 60 in a seventh configuration of a security alarm system. The seventh configuration of the security alarm system is a wireless security alarm system in which the RFID tag 10 is mounted on framing 85, in this example a side jamb 64 of the door 60 near a sill 66 thereof and the sensor 20 is mounted on a stile 62 of the door 60 in part and mounted on the bottom rail 68 of the door in part. However this is not strictly required and in other embodiments, the sensor may be mounted solely on the bottom rail and spaced-apart from the stile, or may be mounted solely on the stile and spaced-apart from the bottom rail. The door 60 is movable linearly relative to framing 85 in a horizontal direction along horizontal axis 87 seen in FIG. 14 in this example.

Figure 14:
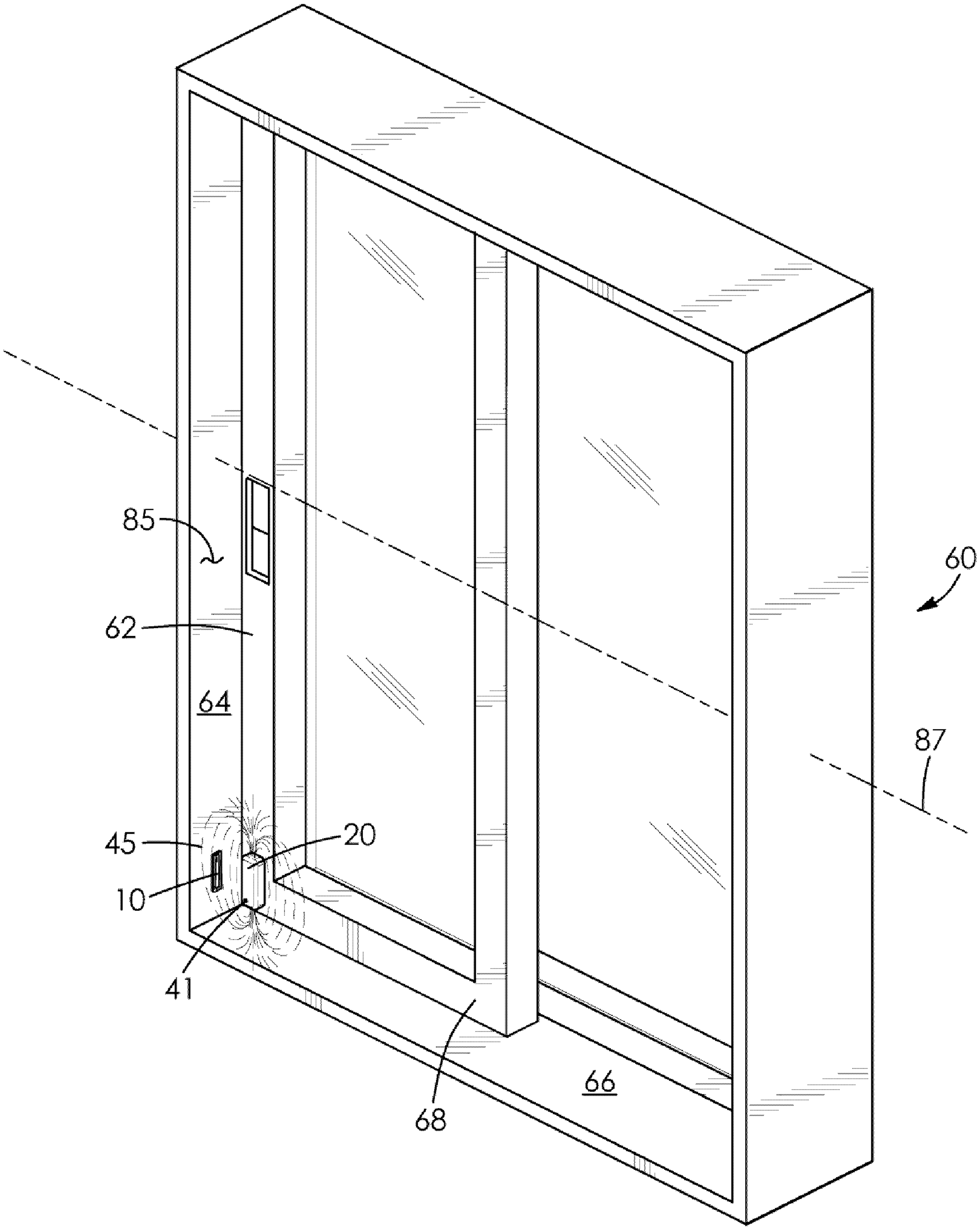
FIG. 14 is a perspective view showing the RFID tag and the sensor being used as a door sensor in a seventh configuration of a security alarm system with the door closed, with the sensor being shown in its default setting.
Figure 15:
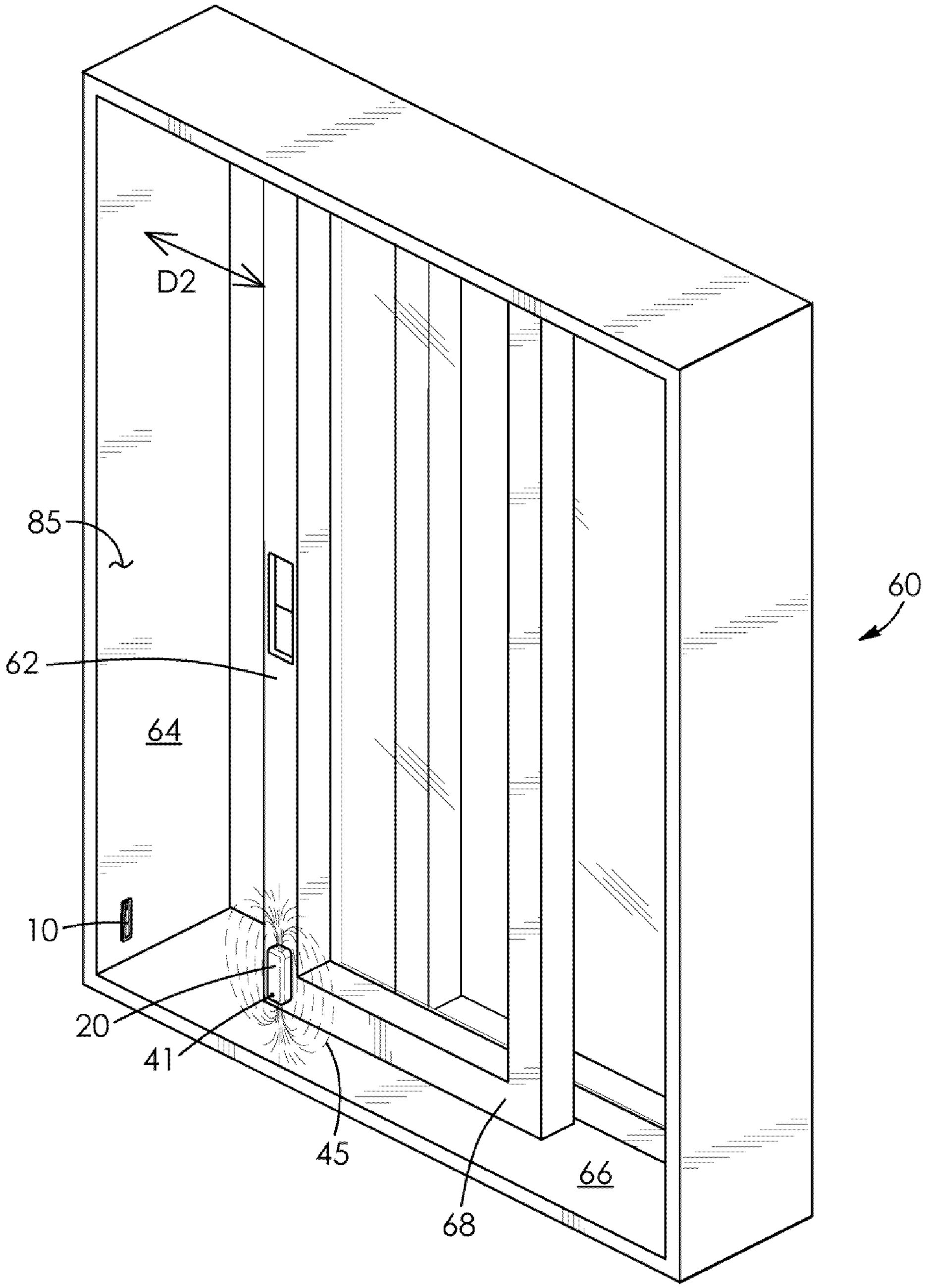
FIG. 15 is a perspective view showing the RFID tag and the sensor being used as the door sensor in the seventh configuration of the security alarm system, with the door being open the distance D2, and with the sensor being shown in its default setting.

The door 60 is fully closed in FIG. 14 with the stile 62 of the door 60 abutting the side jamb 64 of framing 85. The sensor 20 is able to read the RFID tag 10 when the door 60 is fully closed and signals that the door 60 is closed. With reference to FIG. 15, when the door 60 is open to a distance D2, the sensor 20 in its default setting is no longer able to read the RFID tag 10 and an alarm is triggered.

Figure 16:
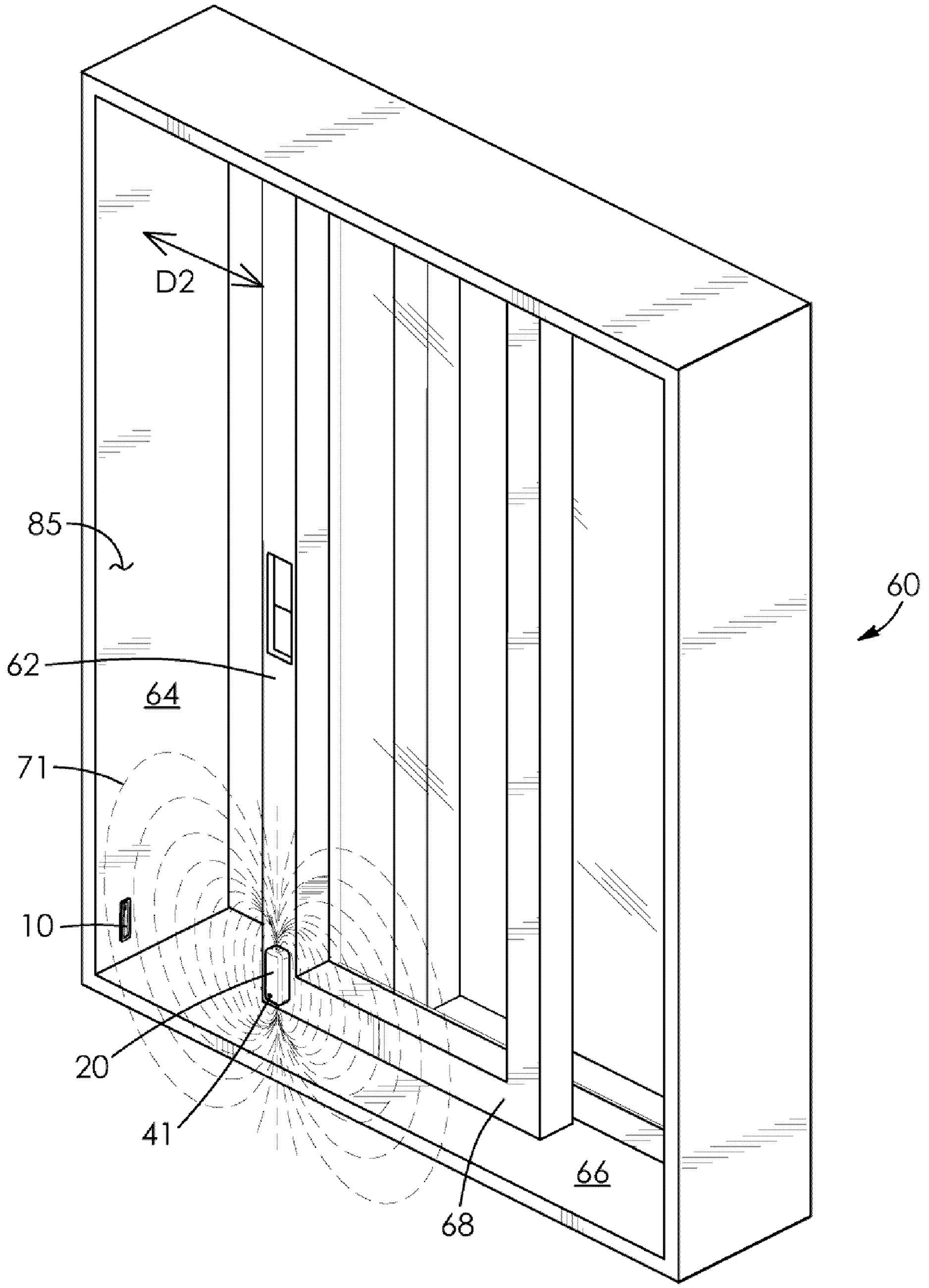
FIG. 16 is a perspective view similar to FIG. 15 showing the RFID tag and the sensor being used as the door sensor in the seventh configuration of the security alarm system, with the door being open the distance D2, with the signal range adjuster having been actuated such that the sensor is operating with an electromagnetic field strengthened/enlarged so as to be in range of the RFID tag.
Figure 17:
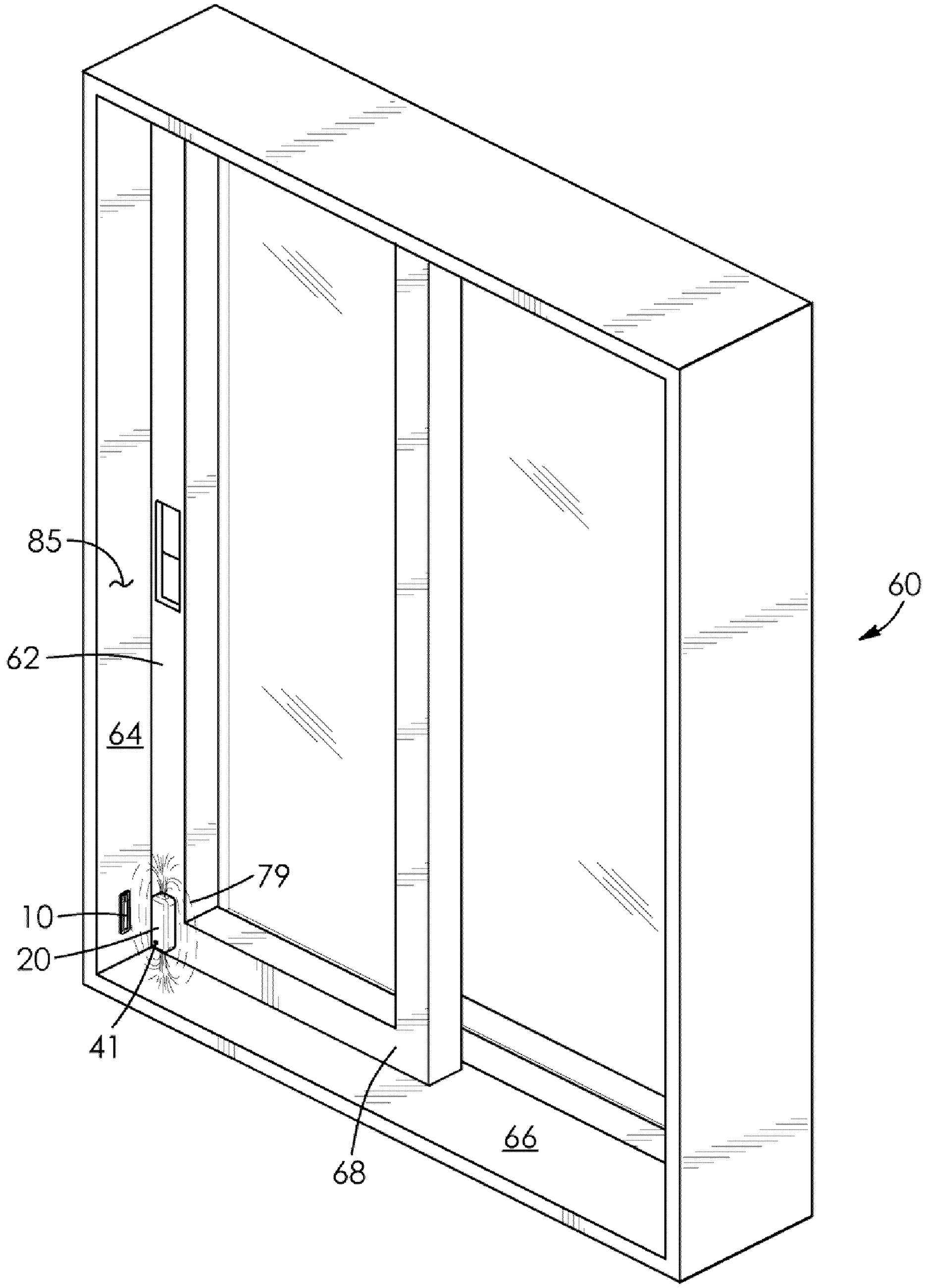
FIG. 17 is a perspective view showing the RFID tag and the sensor being used as the door sensor in the seventh configuration of the security alarm system with the door closed, with the signal range adjuster having been actuated such that the sensor is operating with an incrementally weakened/reduced electromagnetic field, with the maximum signal range of the sensor so adjusted corresponding to the sensor being able to read the RFID tag when the door is closed, and with opening of the door causing the sensor to be unable to read the RFID tag.

The sensor 20 includes signal range adjuster 41 which enables the range of the sensor to be selectively increased such that the alarm is not triggered until the door is opened past distance D2, for example, as seen in FIG. 16. The signal range adjuster also enables the range of the sensor to be decreased such that the alarm is triggered when the door is opened at all, as seen in FIG. 17. The signal range adjuster 41 operates in a substantially similar manner to the sensor 20 described in FIGS. 1 to 8 and thus will not be described in further detail.

Figure 18:
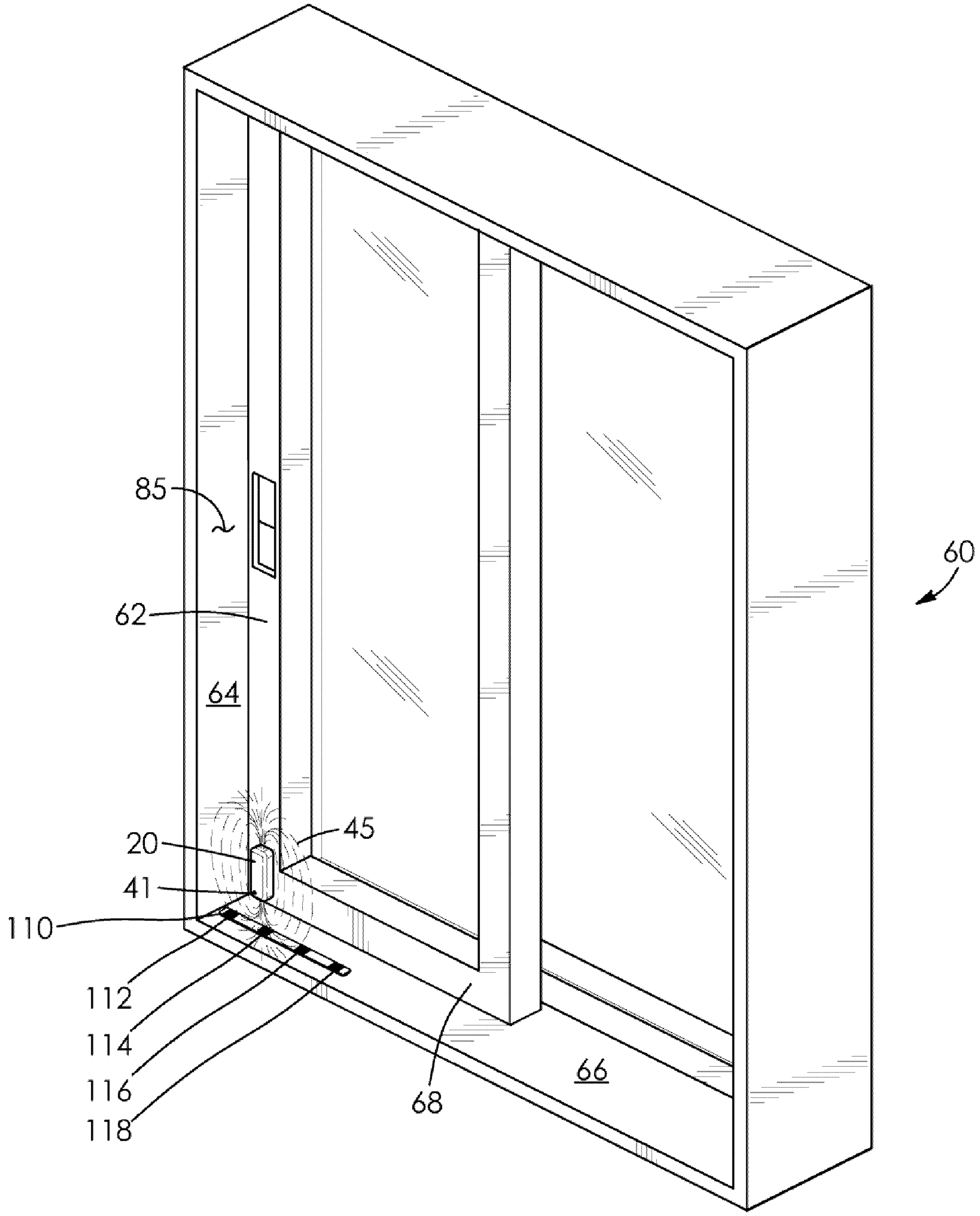
FIG. 18 is a perspective view showing the substrate strip with a plurality of RFID tags thereon and showing the sensor being used as a door sensor in an eighth configuration of a security alarm system, with the door closed and with the sensor being shown in its default setting.

FIG. 18 shows the substrate strip 110 with RFID tags 112, 114, 116 and 118, and the sensor 20 being used as a door sensor for door 60 in an eighth configuration of a security alarm system. The eighth configuration of the security alarm system is a wireless security alarm system in which the sensor 20 is mounted on the stile 62 of the door 60 and the substrate strip 110 is mounted on framing 85, in this example the sill 66 of the door. The sensor 20 includes signal range adjuster 41 and otherwise operates in a substantially similar manner to the sensor 20 described in FIGS. 1 to 8 above.

Figure 19:
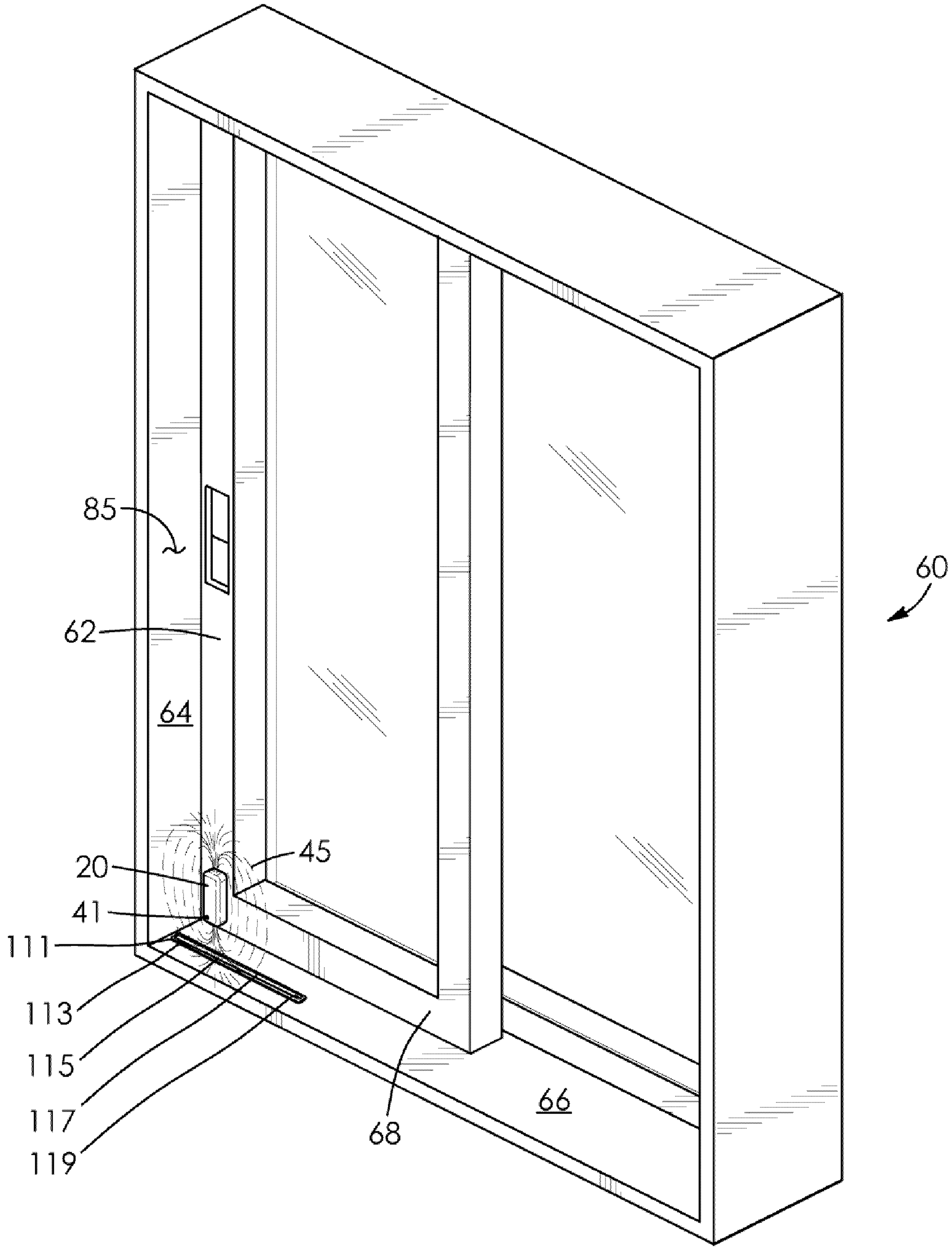
FIG. 19 is a perspective view showing the elongate RFID tag and the sensor being used as a door sensor in a ninth configuration of a security alarm system, with the door closed and with the sensor being shown in its default setting.

FIG. 19 shows the elongate RFID tag 111 and the sensor 20 being used as a door sensor for door 60 in a ninth configuration of a security alarm system. The ninth configuration of the security alarm system is a wireless security alarm system in which the sensor 20 is mounted on the stile 62 of the door 60 and the elongate RFID tag 111 is mounted on framing 85, in this example the sill 66 of the door. The sensor includes signal range adjuster 41 and otherwise operates in a substantially similar manner to the sensor 20 described in FIGS. 1 to 8 above.

Figure 20:
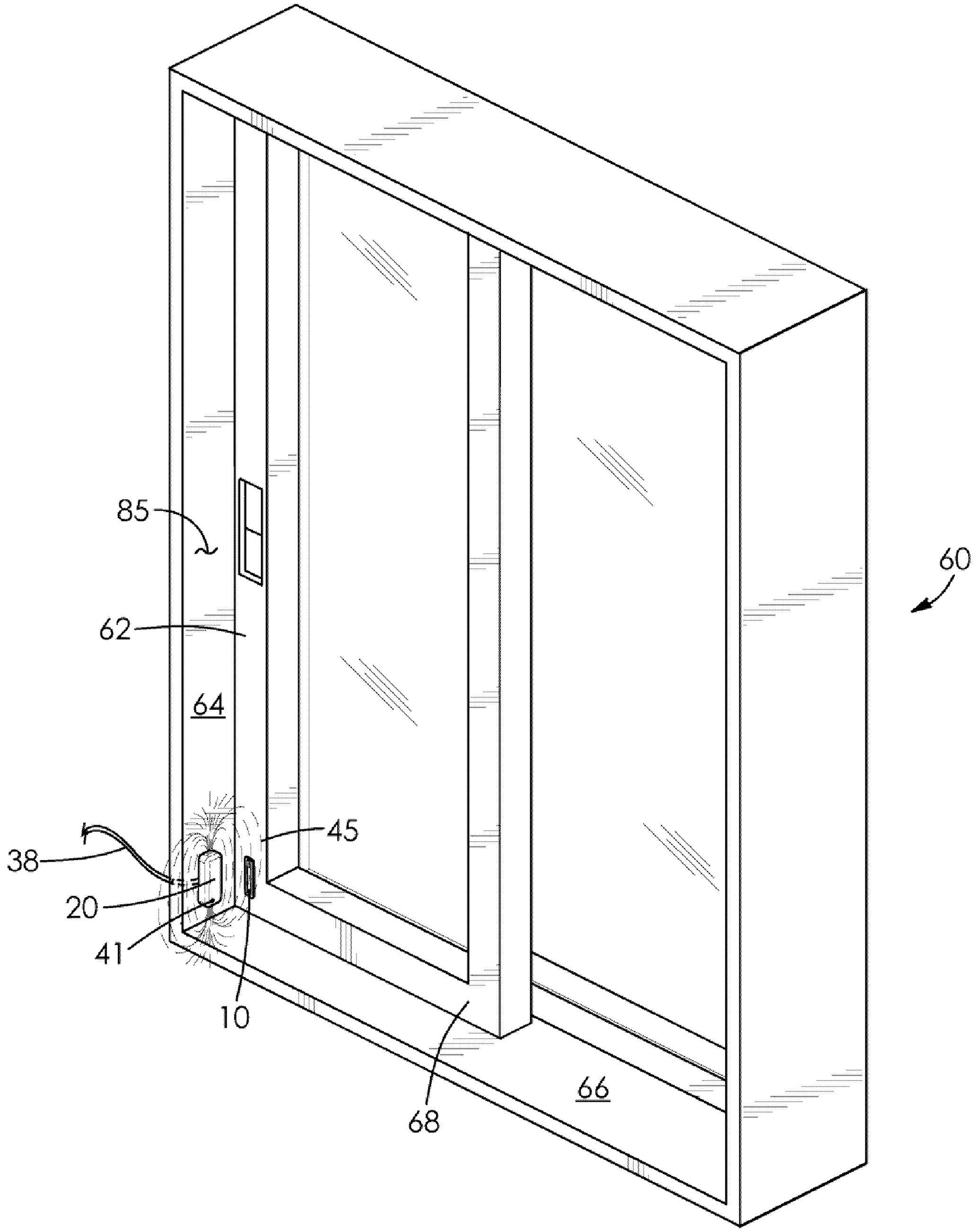
FIG. 20 is a perspective view showing the RFID tag and the sensor being used as the door sensor in a tenth configuration of a security alarm system, with the door closed and with the sensor being shown in its default setting.

FIG. 20 shows the RFID tag 10 and the sensor 20 being used as a door sensor for door 60 in a tenth configuration of a security alarm system. The tenth configuration of the security alarm system is a wired security alarm system in which the RFID tag 10 is mounted on the stile 62 of the door 60 and the sensor 20 is mounted on framing 85, in this example the side jamb 64 of the door 60 near the sill 66 thereof. This allows the sensor 20 to be wired in the tenth configuration of the security alarm system. The sensor 20 includes signal range adjuster 41 and otherwise operates in a substantially similar manner to the sensor 20 described in FIGS. 1 to 8 above.

Figure 21:
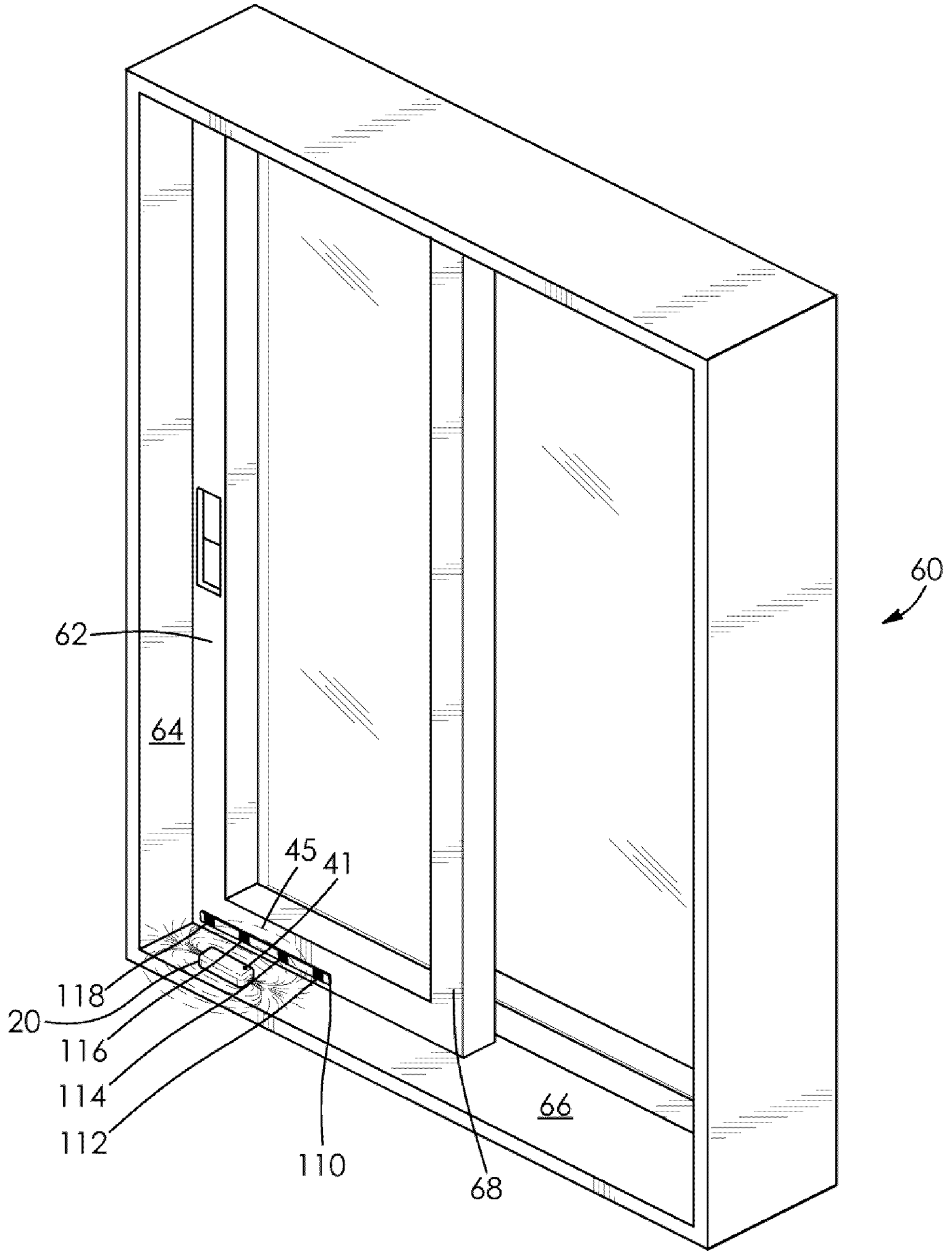
FIG. 21 is a perspective view showing the substrate strip and the sensor being used as a door sensor in an eleventh configuration of a security alarm system, with the door closed and with the sensor being shown in its default setting.

FIG. 21 shows the substrate strip 110 with RFID tags 112, 114, 116 and 118, and the sensor 20 being used as a door sensor for door 60 in an eleventh configuration of a security alarm system. The eleventh configuration of the security alarm system is a wired security alarm system in which the sensor 20 is mounted on framing 85, in this example the sill 66 of the door 60 and the substrate strip 110 is mounted on the bottom rail 68 of the door 60. This allows the sensor 20 to be wired in the eleventh configuration of the security alarm system. The sensor 20 includes signal range adjuster 41 and otherwise operates in a substantially similar manner to the sensor 20 described in FIGS. 1 to 8 above.

Figure 22:
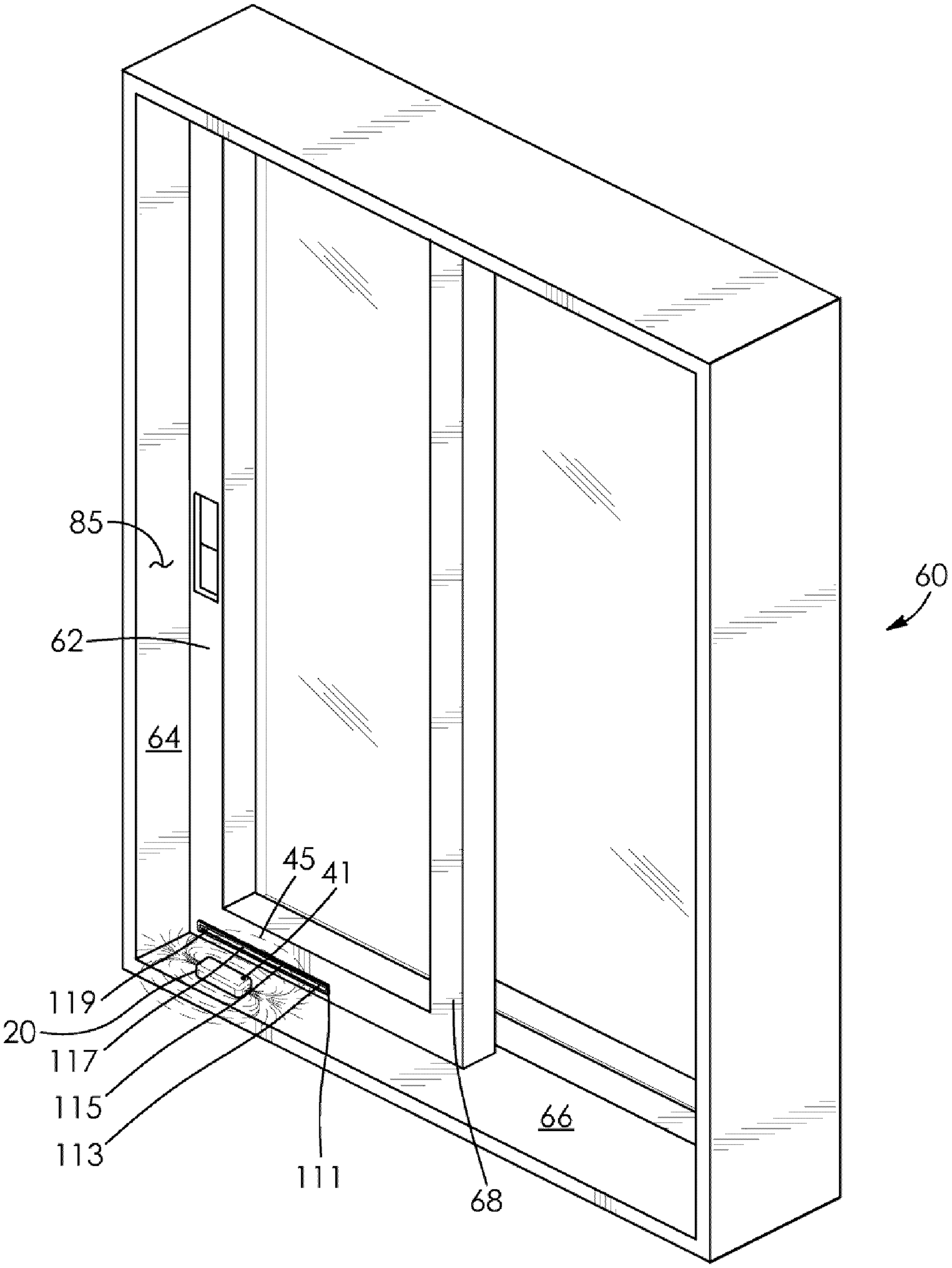
FIG. 22 is a perspective view showing the elongate RFID tag and the sensor being used as a door sensor in a twelfth configuration of a security alarm system, with the door closed and with the sensor being shown in its default setting.

FIG. 22 shows the elongate RFID tag 111 and the sensor 20 being used as a door sensor for door 60 in a twelfth configuration of a security alarm system. The twelfth configuration of the security alarm system is a wired security alarm system in which the sensor 20 is mounted on framing 85, in this example the sill 66 of the door 60 and the elongate RFID tag 111 is mounted on the bottom rail 68 of the door 60. This allows the sensor 20 to be wired in the twelfth configuration of the security alarm system. The sensor 20 includes signal range adjuster 41 and otherwise operates in a substantially similar manner to the sensor 20 described in FIGS. 1 to 8 above.

It will be appreciated that many variations are possible within the scope of the invention described herein. It will be understood by someone skilled in the art that many of the details provided above are by way of example only and are not intended to limit the scope of the invention which is to be determined with reference to at least the following claims.

What is claimed is:

1. A security alarm system for a window/door, the window/door being moveable relative to a framing thereof, and the security alarm system comprising:

a radio frequency identification (RFID) tag and a sensor including an RFID reader, wherein either the RFID tag is mounted to the window/door and the sensor is mounted to the framing, or the RFID tag is mounted to the framing and the sensor is mounted to the window/door, with a distance between the sensor and the RFID tag varying as the window/door is opened, wherein the sensor includes a microprocessor, and wherein the sensor includes a signal range adjuster actuation of which alters the range within which the sensor can read the RFID tag, wherein when the signal range adjuster is actuated, the microprocessor determines whether the sensor reads the RFID tag, and if so, the microprocessor incrementally decreases the range of the RFID reader until the microprocessor determines that the RFID reader reaches a predetermined minimum threshold level of reading the RFID tag, with the signal range adjuster thus enabling the extent to which the window/door is opened without triggering an alarm to be customized; and a control panel, with the sensor signaling the control panel to trigger the alarm when the distance between the sensor and the RFID tag increases beyond the distance so customized and the sensor cannot read the RFID tag.

2. The system as claimed in claim 1, wherein the signal range adjuster alters an electromagnetic field generated by the RFID reader.

3. The system as claimed in claim 1, wherein the signal range adjuster alters the amount of transmitter power output of the RFID reader.

4. The system as claimed in claim 1, wherein the signal range adjuster enables power to the RFID reader to be selectively increased or decreased to expand or reduce the range of the RFID reader.

5. The system as claimed in claim 1, wherein the RFID reader includes an antenna and wherein the signal range adjuster alters the amount of oscillating current passing through the antenna.

6. The system as claimed in claim 1, wherein the sensor includes a housing within which the RFID reader is positioned and within which the signal range adjuster is positioned at least in part, and wherein the signal range adjuster is actuated via a push-button mounted to the housing.

7. The system as claimed in claim 1, wherein actuation of the signal range adjuster when the window/door is closed, causes the control panel to trigger the alarm when the window/door is opened.

8. The system as claimed in claim 1, wherein actuation of the signal range adjuster while or prior to opening the window/door, enables the window/door to be opened without triggering the alarm.

9. The system as claimed in claim 1, wherein selective actuation of the signal range adjuster enables the extent to which the window/door is opened without triggering the alarm to vary.

10. The system as claimed in claim 1, wherein selective actuation of the signal range adjuster enables a user-determined extent to which the window/door is open past which the alarm is triggered, to vary incrementally from a fully closed position of the window/door towards a fully open position of the window/door.

11. The system as claimed in claim 1, wherein when the signal range adjuster is actuated, if the microprocessor determines that the sensor cannot read the RFID tag, the microprocessor causes the signal range adjuster to incrementally increase the range of the RFID reader until the sensor reads the RFID tag.

12. The system as claimed in claim 11 wherein after the microprocessor causes the signal range adjuster to incrementally increase the range of the RFID reader until the sensor reads the RFID tag, the microprocessor renders the signal range adjuster inoperable.

13. The system as claimed in claim 11 wherein after the microprocessor causes the signal range adjuster to incrementally increase the range of the RFID reader until the sensor reads the RFID tag, the microprocessor renders the signal range adjuster inoperable until the signal range adjuster is actuated once more.

14. A method of installing a security alarm system for a window/door, the system including a radio frequency identification (RFID) tag and a sensor with an RFID reader, the window/door being moveable relative to a framing thereof, the method comprising:

providing the security alarm system with a signal range adjuster actuation of which varies the extent to which the window/door is opened without triggering an alarm, with the signal range adjuster thus enabling the extent to which the window/door is opened without triggering the alarm to be customized;

either coupling the RFID tag to the window/door and coupling the sensor to the framing, or coupling the sensor to the window/door and the RFID tag to the framing;

opening the window/door to a user-determined position;

adjusting via said signal range adjuster, a maximum signal range of the sensor past which the sensor is unable to read the RFID tag to correspond to said user-determined position;

providing a control panel to which the sensor signals to trigger the alarm when a distance between the sensor and the RFID tag increases past said user-determined position such that the sensor is unable to read the RFID tag.

15. The method as claimed in claim 14, wherein the opening step includes opening the window/door to facilitate ventilation and inhibit an intruder from passing through said window/door.

16. The method according to claim 14, wherein the signal range adjuster alters an electromagnetic field generated by the RFID reader.

17. The method as claimed in claim 14, wherein the signal range adjuster alters the amount of transmitter power output of the RFID reader, and/or wherein the signal range adjuster enables power to the RFID reader to be selectively increased or decreased to expand or reduce the range of the RFID reader.

18. The method as claimed in claim 14, wherein the RFID reader includes an antenna and wherein the signal range adjuster alters the amount of oscillating current passing through the antenna.

19. A method of installing a security alarm system for a window/door, the system including a radio frequency identification (RFID) tag, a sensor with an RFID reader, and a signal range adjuster, the window/door being moveable relative to a framing thereof, and the method comprising:

either coupling the RFID tag to the window/door and coupling the sensor to the framing, or coupling the sensor to the window/door and the RFID tag to the framing;

opening the window/door to a user-determined position;

adjusting via said signal range adjuster, a maximum signal range of the sensor past which the sensor is unable to read the RFID tag to correspond to said user-determined position, including determining whether the RFID reader is in range of the RFID tag, and i) if the RFID reader is not in range of the RFID tag, incrementally increasing the range of the RFID reader via the signal range adjuster until the sensor reads the RFID tag, and ii) if the RFID reader is in range of the RFID tag, incrementally decreasing the range of the RFID reader via the signal range adjuster until the RFID reader reaches a predetermined minimum threshold level of reading the RFID tag; and providing a control panel to which the sensor signals to trigger an alarm when a distance between the sensor and the RFID tag increases past said user-determined position such that the sensor is unable to read the RFID tag, wherein said signal range adjuster thus enables the extent to which the window/door is opened without triggering the alarm to be customized.

20. A method of installing a security alarm system for a window/door, the system including a radio frequency identification (RFID) tag, a sensor with an RFID reader, and a signal range adjuster, the window/door being moveable relative to a framing thereof, and the method comprising:

either coupling the RFID tag to the window/door and coupling the sensor to the framing, or coupling the sensor to the window/door and the RFID tag to the framing;

opening the window/door to a user-determined position;

adjusting via said signal range adjuster, a maximum signal range of the sensor past which the sensor is unable to read the RFID tag to correspond to said user-determined position, including determining whether the RFID reader is in range of the RFID tag, and i) if the RFID reader is not in range of the RFID tag, incrementally increasing the range of the RFID reader via the signal range adjuster until the sensor reads the RFID tag, and ii) if the RFID reader is in range of the RFID tag, incrementally decreasing the range of the RFID reader via the signal range adjuster until the sensor no longer reads the RFID tag and thereafter incrementally increasing the range of the RFID reader via the signal range adjuster until the sensor reads the RFID tag once more; and providing a control panel to which the sensor signals to trigger an alarm when a distance between the sensor and the RFID tag increases past said user-determined position such that the sensor is unable to read the RFID tag, wherein said signal range adjuster thus enables the extent to which the window/door is opened without triggering the alarm to be customized.

* * * * *